United States Patent
Yokoyama et al.

(10) Patent No.: US 12,077,160 B2
(45) Date of Patent: Sep. 3, 2024

(54) APPARATUS AND METHOD FOR PERFORMING AN ACTION ASSOCIATED WITH A DRIVER INPUT INDICATED VIA AN INPUT MODALITY OF A HUMAN MACHINE INTERFACE OF A VEHICLE

(71) Applicant: TOYOTA MOTOR ENGINEERING & MANUFACTURING NORTH AMERICA, INC., Plano, TX (US)

(72) Inventors: Hiroshi Yokoyama, Tokyo (JP); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 518 days.

(21) Appl. No.: 17/090,392

(22) Filed: Nov. 5, 2020

(65) Prior Publication Data

US 2022/0135048 A1     May 5, 2022

(51) Int. Cl.
*B60W 40/08* (2012.01)
*B60K 35/00* (2024.01)
*B60K 35/10* (2024.01)
*B60K 35/20* (2024.01)
*B60W 30/095* (2012.01)
(Continued)

(52) U.S. Cl.
CPC ............ *B60W 40/08* (2013.01); *B60K 35/00* (2013.01); *B60W 30/0956* (2013.01); *G06V 20/58* (2022.01); *G06V 20/597* (2022.01); *B60K 35/10* (2024.01); *B60K 35/20* (2024.01); *B60K 2360/143* (2024.01); *B60W 2420/403* (2013.01); *B60W 2420/408* (2024.01);
(Continued)

(58) Field of Classification Search
CPC .. B60W 40/08; B60W 30/0956; G06V 20/58; G06V 20/597; B60K 35/00
See application file for complete search history.

(56) References Cited

U.S. PATENT DOCUMENTS 8,768,286 B2   7/2014 Naboulsi
8,810,513 B2   8/2014 Ptucha et al.
(Continued)

FOREIGN PATENT DOCUMENTS

GB      2525045 A      10/2015
KR    10-1860731       5/2018

*Primary Examiner* — Jelani A Smith
*Assistant Examiner* — Toya Pettiegrew
(74) *Attorney, Agent, or Firm* — Oblon, McClelland, Maier & Neustadt, L.L.P.

(57) ABSTRACT

The present disclosure relates to driver interaction with a user interface of a vehicle. In particular, the present disclosure relates to an apparatus for performing an action associated with a driver input indicated via an input modality of an HMI of a vehicle, the apparatus comprising processing circuitry configured to receive initial data corresponding to an initial driver input via a first input modality of the HMI of the vehicle, compare a confidence level of the initial data to a confidence level threshold associated with the first input modality of the HMI of the vehicle, request, based on the comparison, a subsequent driver input via a second input modality of the HMI of the vehicle, determine a presence of an adverse condition within a vehicle environment, and perform an action associated with the subsequent driver input based on the presence of the adverse condition within the vehicle environment.

15 Claims, 14 Drawing Sheets

(51) Int. Cl.
  *G01C 21/36* (2006.01)
  *G06V 20/58* (2022.01)
  *G06V 20/59* (2022.01)

(52) U.S. Cl.
  CPC ... *B60W 2420/54* (2013.01); *B60W 2540/229* (2020.02); *G01C 21/3605* (2013.01); *G06V 2201/08* (2022.01)

(56) References Cited

U.S. PATENT DOCUMENTS

| | | |
|---|---|---|
| 9,104,243 B2 | 8/2015 | Shin |
| 9,540,016 B2 | 1/2017 | Tan |
| 10,061,388 B2 | 8/2018 | Shin et al. |
| 2013/0124550 A1* | 5/2013 | Oel .................... G01C 21/3608 707/758 |
| 2013/0201316 A1 | 8/2013 | Binder et al. |
| 2016/0091978 A1 | 3/2016 | Park |
| 2018/0127001 A1* | 5/2018 | Ricci .................... B60W 50/14 |
| 2018/0143298 A1* | 5/2018 | Newman ............ G01C 21/3484 |
| 2018/0365772 A1* | 12/2018 | Thompson ............... G06N 7/01 |
| 2019/0073040 A1 | 3/2019 | Luchner et al. |
| 2019/0237079 A1 | 8/2019 | Schwarz |
| 2019/0246235 A1 | 8/2019 | Bruser et al. |
| 2020/0219320 A1* | 7/2020 | Moniri .................. B60K 35/00 |
| 2021/0201676 A1* | 7/2021 | Tariq ..................... G08G 1/012 |
| 2022/0058402 A1* | 2/2022 | Hunt .................... H04N 23/661 |

\* cited by examiner

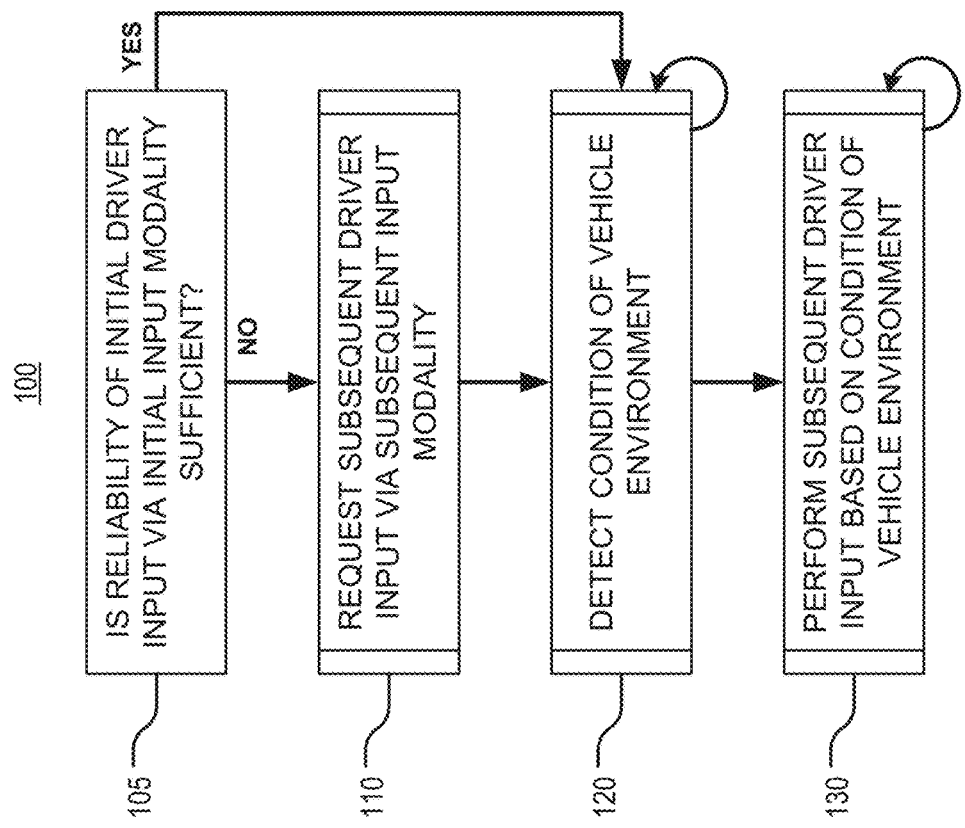

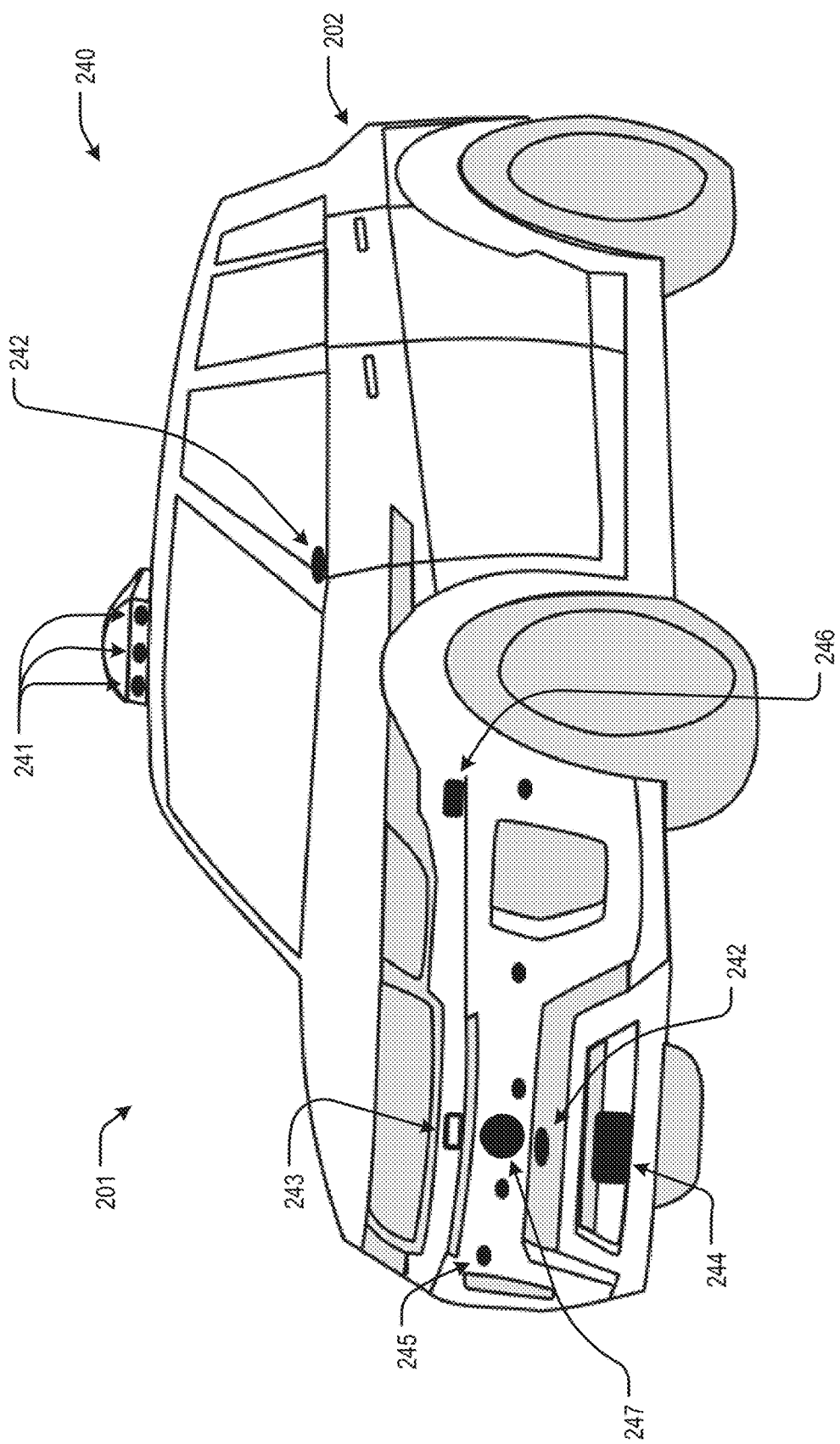

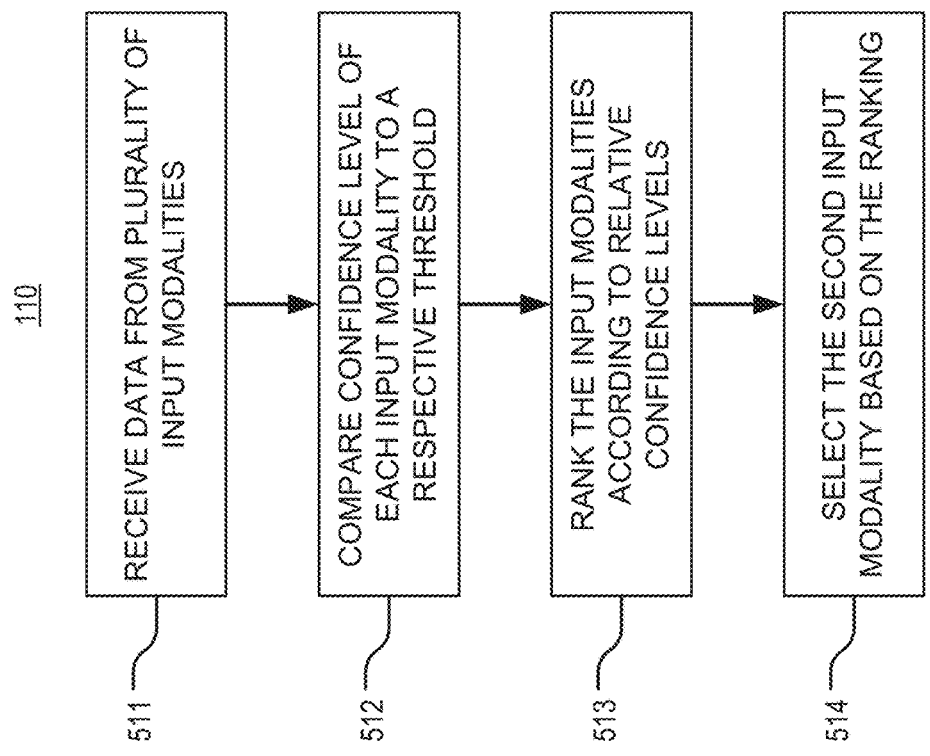

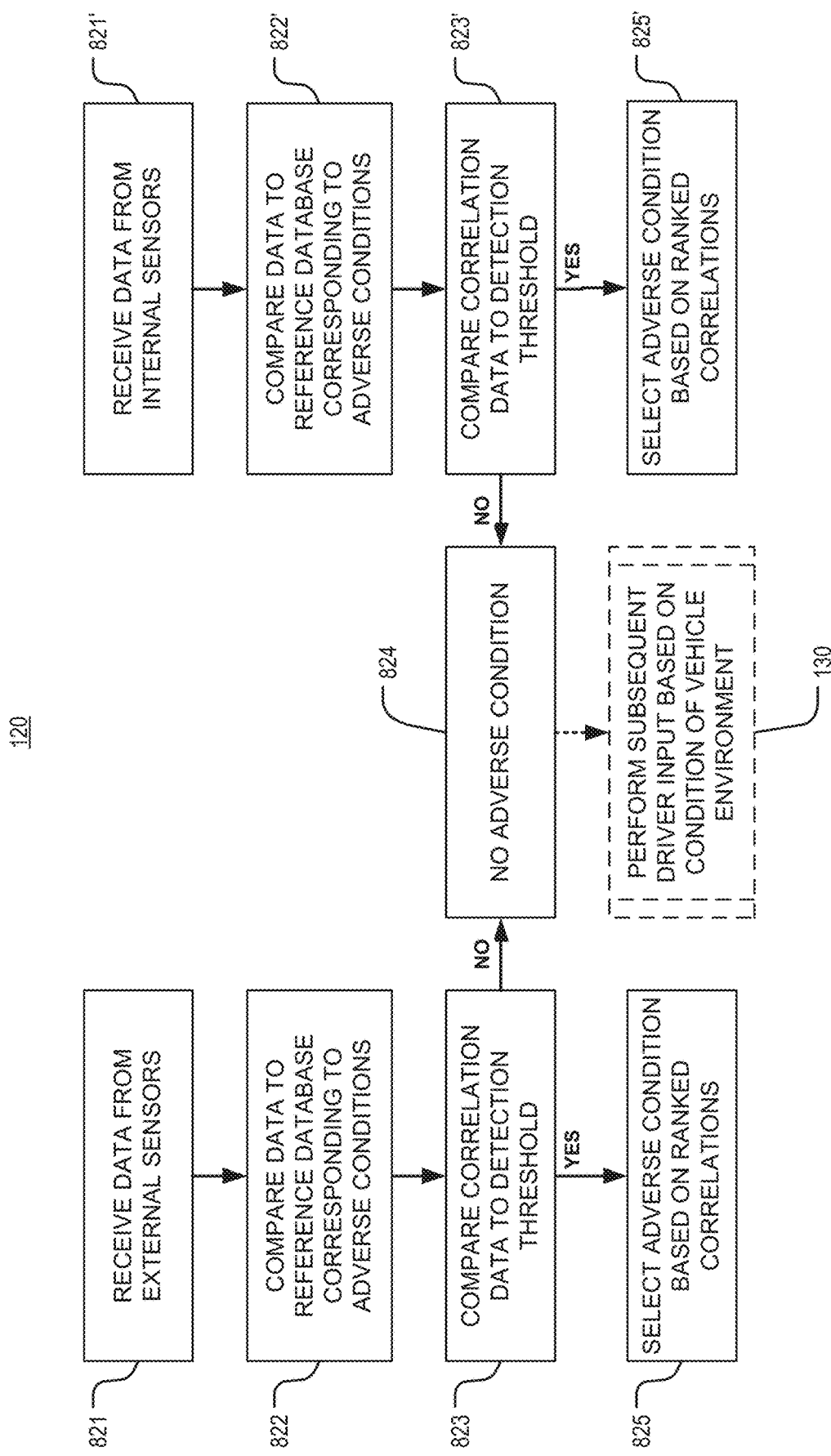

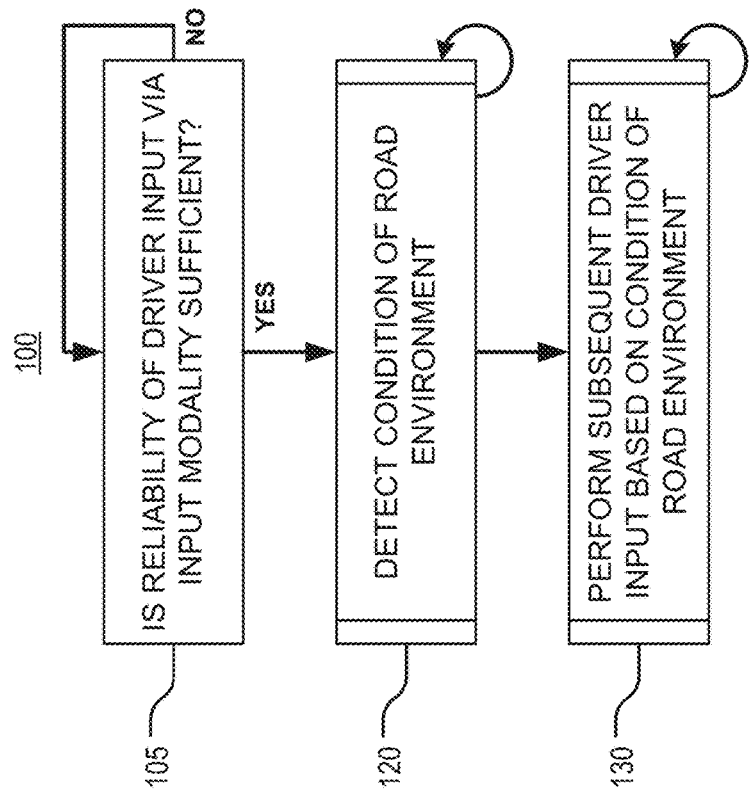

APPARATUS AND METHOD FOR PERFORMING AN ACTION ASSOCIATED WITH A DRIVER INPUT INDICATED VIA AN INPUT MODALITY OF A HUMAN MACHINE INTERFACE OF A VEHICLE

BACKGROUND

The use of human machine interfaces (HMIs), as it relates to motor vehicles, is increasingly common. HMIs, which may include systems for gesture recognition, voice recognition, and the like, are intended to reduce levels of distraction during vehicle operation by recognizing and responding to user inputs without the driver having to shift their focus from the road.

During vehicle navigation, however, certain environmental factors can impact the ability of an HMI to discern user inputs. For instance, elevated road noise, engine noise, and vehicle vibration may impact the ability of voice recognition methods to accurately identify spoken inputs. In such cases, the driver may be forced to interact with the HMI in other, increasingly distracting ways. Moreover, these same environmental factors may be cause for increased driver attention to the road. In other instances, the presence of emergency vehicles may require increased user focus and attention, driver characteristics that may be impeded by enacting of driver requested actions by the HMI. Korean Patent No. 101860731 B1 entitled "Gesture Recognition Interface Device For Vehicle" by Park is directed to a method for reducing activity of a gesture recognition system when an accident is anticipated. However, to this date, a solution to the above, complex constraints of an HMI have yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to performing a requested action of a driver of a vehicle, as indicated by a human machine interface of the vehicle.

According to an embodiment, the present disclosure further relates to an apparatus for performing an action associated with a driver input indicated via an input modality of a human machine interface of a vehicle, the apparatus comprising processing circuitry configured to receive initial data corresponding to an initial driver input via a first input modality of the human machine interface of the vehicle, compare a confidence level of the initial data to a confidence level threshold associated with the first input modality of the human machine interface of the vehicle, request, based on the comparison, a subsequent driver input via a second input modality of the human machine interface of the vehicle, determine a presence of an adverse condition within a vehicle environment, and perform an action associated with the subsequent driver input based on the presence of the adverse condition within the vehicle environment. In an embodiment, the processing circuitry is configured to perform an action associated with the subsequent driver input based on the presence of the adverse condition within the vehicle environment by delaying performing the an action associated with subsequent driver input when the adverse condition is present within the vehicle environment. Further, in an embodiment, the processing circuitry is configured to delay the performing the an action associated with subsequent driver input when the adverse condition is present within the vehicle environment by entering, into a buffer, the action associated with the subsequent driver input, determining, iteratively, whether the adverse condition is present within the vehicle environment, and performing the action associated with the subsequent driver input when it is determined the adverse condition is not present within the vehicle environment.

According to an embodiment, the present disclosure further relates to an apparatus for performing an action associated with a driver input indicated via an input modality of a human machine interface of a vehicle, the apparatus comprising processing circuitry configured to receive data corresponding to the driver input via the input modality of the human machine interface of the vehicle, determine a presence of an adverse condition within a vehicle environment, and perform the action associated with the driver input based on the presence of the adverse condition within the vehicle environment.

According to an embodiment, the present disclosure further relates to a non-transitory computer-readable storage medium storing computer-readable instructions that, when executed by a computer, cause the computer to perform a method of performing an action associated with a driver input indicated via an input modality of a human machine interface of a vehicle, comprising receiving initial data corresponding to an initial driver input via a first input modality of the human machine interface of the vehicle, comparing a confidence level of the initial data to a confidence level threshold associated with the first input modality of the human machine interface of the vehicle, requesting, based on the comparison, a subsequent driver input via a second input modality of the human machine interface of the vehicle, determining a presence of an adverse condition within a vehicle environment, and performing an action associated with the subsequent driver input based on the presence of the adverse condition within the vehicle environment.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a flow diagram of a method of performing an input of a driver of a vehicle, according to an exemplary embodiment of the present disclosure;

FIG. 2A is an illustration of an exterior of a vehicle, according to an exemplary embodiment of the present disclosure;

FIG. 5 is a flow diagram of a sub process of a method of performing an input of a driver of a vehicle, according to an exemplary embodiment of the present disclosure;

FIG. 8 is a flow diagram of a sub process of a method of performing an input of a driver of a vehicle, according to an exemplary embodiment of the present disclosure;

FIG. 9 is a flow diagram of a method of performing an input of a driver of a vehicle, according to an exemplary embodiment of the present disclosure.

DETAILED DESCRIPTION

Figure 2B:
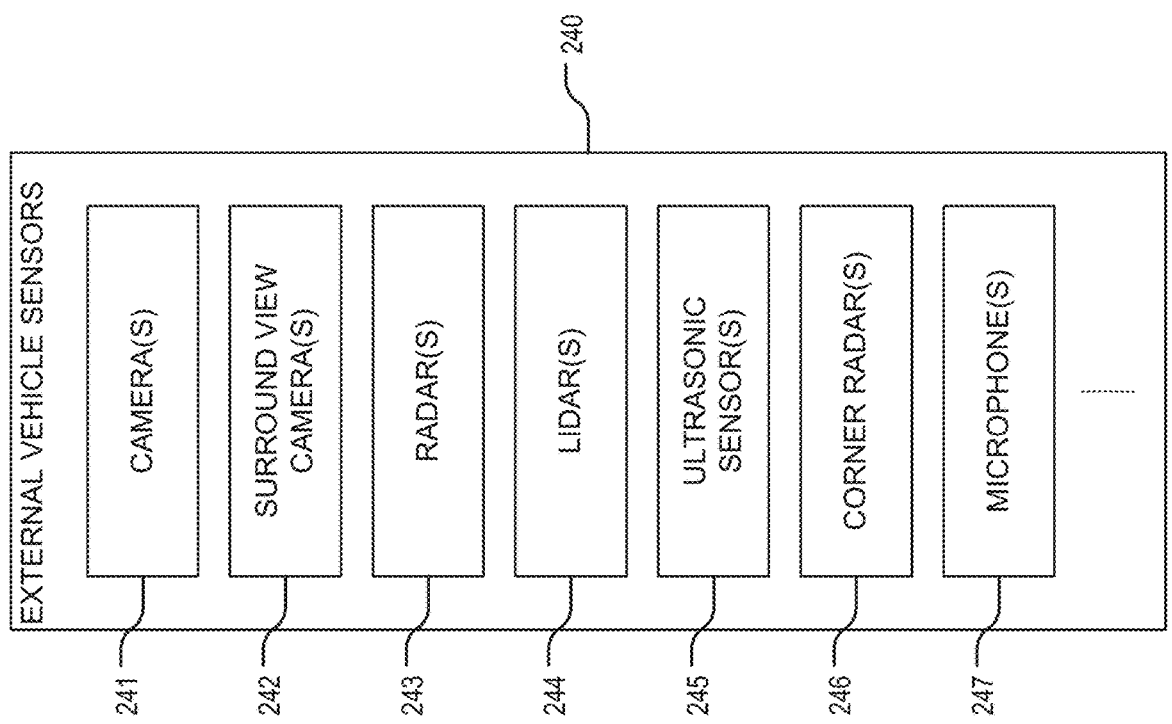
FIG. 2B is a description of external sensors of a vehicle, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "SAV" and "vehicle" may be used interchangeably throughout this document. Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

HMI systems allow a driver to control aspects of the vehicle without diverting their attention from the road. The driver may, among other things, request an audio volume of music playback be increased, request "high-beam" headlights of the vehicle be activated, and/or request a new navigation destination be entered.

While convenient, such HMI systems are not accurate in every instance. In an example, if the driver of the vehicle makes a hand gesture known to be associated with a driver request to reduce the audio volume of the music playback, road vibrations that cause the hand gesture to 'wobble' may result in the HMI being unable to accurately identify the hand gesture. A confidence level of a gesture recognition module of the HMI may be too low to identify the gesture.

This lack of functionality introduces distraction to the driver and requires continued attention to the HMI during subsequent efforts to convey the hand gesture information to the HMI. Moreover, during travel times when emergency vehicles or other distracting events, such as animals in the road or vehicle congestion, are present within an external environment of the vehicle, HMI systems may not be able to detect and identify a driver request when initially made. Instead, the HMI system may require, once the emergency vehicle or other distracting event has subsided, repeated driver input in order to detect, identify, and respond to the driver request. Such failures by the HMI create situations where the driver feels uncomfortable and unsafe.

It can also be appreciated that, beyond distracting events outside the vehicle, it is also important to consider distracting events inside the vehicle, or other events that may distract a driver from the act of driving. For instance, misbehaving children in a rear of the vehicle may pull the attention of the driver from the road. Compounding this with repeated interactions with the HMI further complicates the task of safely driving the vehicle.

According to an embodiment, the present disclosure provides an apparatus and methods for performing a driver requested action in complex driving environments. In view of the above, this can include requesting the driver to provide the input to the HMI via a different input modality in the event data, processed and unprocessed, from a first input modality is not of sufficient quality. The different input modality may be one that is determined to be accurate under current environmental constraints. For example, the different input modality may be a gesture recognition module when a voice recognition module, as the original input modality, is obfuscated by road noise, heavy rain, or by sirens from an emergency vehicle.

In an embodiment, the present disclosure also provides for consideration of external environmental constraints in the performance of a driver requested action. For instance, upon determining an action requested by a driver, the apparatus and methods described herein may determine whether an emergency vehicle, or other adverse road condition (i.e. distracting event), is present within the external environment of the vehicle. When an emergency vehicle or other adverse road condition is detected, the driver requested action may be delayed until after the detected emergency vehicle or other adverse road condition has subsided. This ensures the driver has maximum use of their faculties in identifying the emergency vehicle or other adverse road condition and responding, appropriately, to the identified obstacle. The requested driver action may be stored within a buffer and enacted once the identified obstacle has left the external environment of the vehicle. In this way, the necessity to request the same action of the HMI following the dissipation of the emergency vehicle or other adverse road condition is removed.

In an embodiment, the present disclosure also provides for consideration of internal constraints in the performance of a driver requested action. For instance, upon determining an action requested by a driver, the apparatus and methods described herein may determine whether a misbehaving child, or other distracting event, is present within the cabin of the vehicle, thereby causing the driver to shift focus from the road. Such shifting of the focus of the driver can be determined by gaze detection, for instance. When the gaze shift of the driver is detected, the driver requested action may be delayed until after the gaze of the driver has returned to the road, or until another distracting event in the cabin of the vehicle has subsided. This ensures the driver has maximum use of their faculties in operating the vehicle. The requested driver action may be stored within a buffer and enacted once the distracting event within the cabin of the vehicle is no longer a distraction. In this way, the necessity to request the same action of the HMI following the dissipation of the distracting event.

The apparatus and methods of the present disclosure, introduced briefly above, will now be described with respect to the Figures.

Method 100 provides a high-level flow diagram of the methods of the present disclosure. Method 100 may be performed by a vehicle control system (VCS) of a vehicle. In an embodiment, method 100 is performed by an electronic control unit (ECU) that comprises at least a portion of the VCS. The ECU may be in communication with each of a plurality of vehicle sensors that are located inside the vehicle and outside the vehicle. Portions of software and hardware of the ECU and the VCS may, together or separately, be components of a human machine interface (HMI), and may include processing circuitry(s). For purposes of discussion, method 100 will be described as implemented by the ECU, though it should be appreciated that any processing circuitry(s) can be configured to perform the processes described herein.

In an embodiment, method 100 can be performed locally and/or remotely to the vehicle. In view of inherent latencies of different processing systems, certain processes may be more accurately and/or efficiently performed locally while certain other processes may be more accurately and/or efficiently performed remotely. The term "locally" can be understood to include processor(s) resident within the vehicle (including processor(s) within a mobile device of a passenger) while the term "remotely" can be understood to include processor(s) that are located within a cloud-computing environment.

Returning to method 100, the flow diagram thereof will be described from a perspective of a driver of a vehicle. It can be appreciated, however, that another passenger of the vehicle may interact with the vehicle according to method 100, understanding that actions of another passenger will likely cause distraction for the driver of the vehicle. Further, method 100 of FIG. 1 will be described under the assumption that the driver has already attempted to request an action via an initial input modality of the HMI. The initial input modality of the HMI is an input modality initially chosen by the driver and interacted with. As will be described later, the initial input modality may be one of an eye tracking module or gaze detection module, a voice recognition module implementing natural language processing, a tactile module, and a gesture recognition module, among others.

Accordingly, at step 105 of method 100, a reliability of the initial driver input via the initial input modality can be evaluated. In an embodiment, the evaluation may include a comparison of a confidence level of a vehicle sensor(s) associated with the initial input modality and a threshold confidence level of the vehicle sensor(s). For instance, when the initial input modality is via the voice recognition module, the evaluation may determine that a confidence level of a microphone(s) or other acoustic unit(s) associated with the voice recognition module is below a threshold confidence level required for continued processing. This may be the result of, among other things, increased background noise during high speed travel or during precipitation events. In another embodiment, the evaluation may include a comparison of a confidence level associated with a data processing event of a vehicle sensor(s) associated with the initial input modality and a threshold confidence level thereof. For instance, when the initial input modality is via the voice recognition module, the evaluation may determine that a confidence level of a speech recognition engine or other acoustic processing engine associated with the voice recognition module is below a threshold confidence level required for accurate recognition. This may be the result of, among other things, increased background noise during highway travel, poor communication by the driver, or other events that cause a lack of speech fidelity.

If the evaluation determines the reliability of the initial driver input via the initial input modality is sufficient (i.e. confidence level satisfies threshold), method 100 may proceed to sub process 120. Such flow of method 100 will be described in greater detail with reference to FIG. 6A and FIG. 6B.

Alternatively, if the evaluation at step 105 of method 100 determines the reliability of the initial driver input via the initial input modality is insufficient, method 100 proceeds to sub process 110 and a subsequent driver input is requested via a subsequent input modality. The subsequent input modality is one selected, by the ECU, from a plurality of input modalities, the selection being based on confidence levels of associated vehicle sensor(s) or data processing methods. Though simply described here as a method of selecting the subsequent input modality in order to obtain a reliable driver input, sub process 110 will be described in greater detail with reference to FIG. 5.

After requesting the subsequent driver input and receiving the subsequent driver input via the subsequent input modality, sub process 120 of method 100 determines a condition of a vehicle environment that, in part, determines if an action associated with the subsequent driver input should be performed. The vehicle environment determination can include, among other things, a detection of an adverse condition (i.e. distracting event) of a vehicle environment, including a condition of a road surrounding the vehicle and a condition of a cabin of the vehicle. In an embodiment, the adverse condition may be an emergency vehicle, a weather event, and the like within an exterior environment of the vehicle, or a misbehaving child, a noisy conversation, or other distracting event within a cabin of the vehicle. The determination of the condition of the vehicle environment, along with the subsequent driver input received at sub process 110 of method 100, may be output from sub process 120 of method 100.

In an alternative embodiment, method 100, upon determining the presence of a distracting event within the vehicle environment, may return vehicle settings to a baseline, or 'safe state', until the distracting event within the vehicle environment has subsided. The 'safe state' may include a previous state of the vehicle, before the driver input, or can be a state of the vehicle stored in memory. The state of the vehicle stored in memory can be one that resets musical playback of the vehicle, modifies a speed of the vehicle, and/or adjust the air cooling system of the vehicle.

Accordingly, sub process 130 of method 100 receives the determination of the condition of the vehicle environment and the subsequent driver input received at sub process 110 of method 100. If the output indicates the condition of the vehicle environment is determined to be an adverse condition in, for instance, the external environment of the vehicle, sub process 130 of method 100 can be iteratively performed until the adverse condition has subsided and the output from sub process 120 of method 100 indicates the same. Concurrently, the subsequent driver input can be stored in a database until the action associated with the subsequent driver input can be safely performed.

Upon receiving the output indicating the adverse condition has subsided and the vehicle environment is determined to be a normal condition (i.e. no adverse condition detected in the external environment or the internal environment), the action associated with the subsequent driver input can be performed.

It can be appreciated that different driver inputs can be associated with different ones of a plurality of distinct actions that can be performed by the vehicle. For instance, the action can be an increase in audio volume of the music playback. For brevity, an exhaustive list of driver inputs and corresponding actions will be omitted. However, any number of actions readily performed within the vehicle may be envisioned as implementable according to the method described herein.

As described above, in receiving the output indicating detection of the adverse condition within the vehicle environment, the ECU may determine that an action associated with a subsequent driver input should not be immediately performed at sub process 130 of method 100, as performing the action may distract the driver from operating the vehicle. Accordingly, the subsequent driver input can be stored in the database and readily accessed when appropriate. In this way, the ECU allows the driver to focus on the activity of driving the vehicle without distraction while the adverse condition is present. Moreover, by recognizing the driver-requested action but not acting on the driver-requested action, the ECU does not require continued interaction with the driver.

It can be appreciated that the apparatus and methods introduced above and described below can be implemented within a vehicle having an HMI system(s) and/or within a semi-autonomous vehicle (SAV) having an HMI system(s). FIG. 2A is an illustration of an SAV 201 deploying an HMI system(s) as part of a VCS 202, according to an exemplary embodiment of the present disclosure. The ECU may be integral with the HMI and the VCS. The external vehicle sensors described below can be further considered with reference to FIG. 2B.

Figure 10:
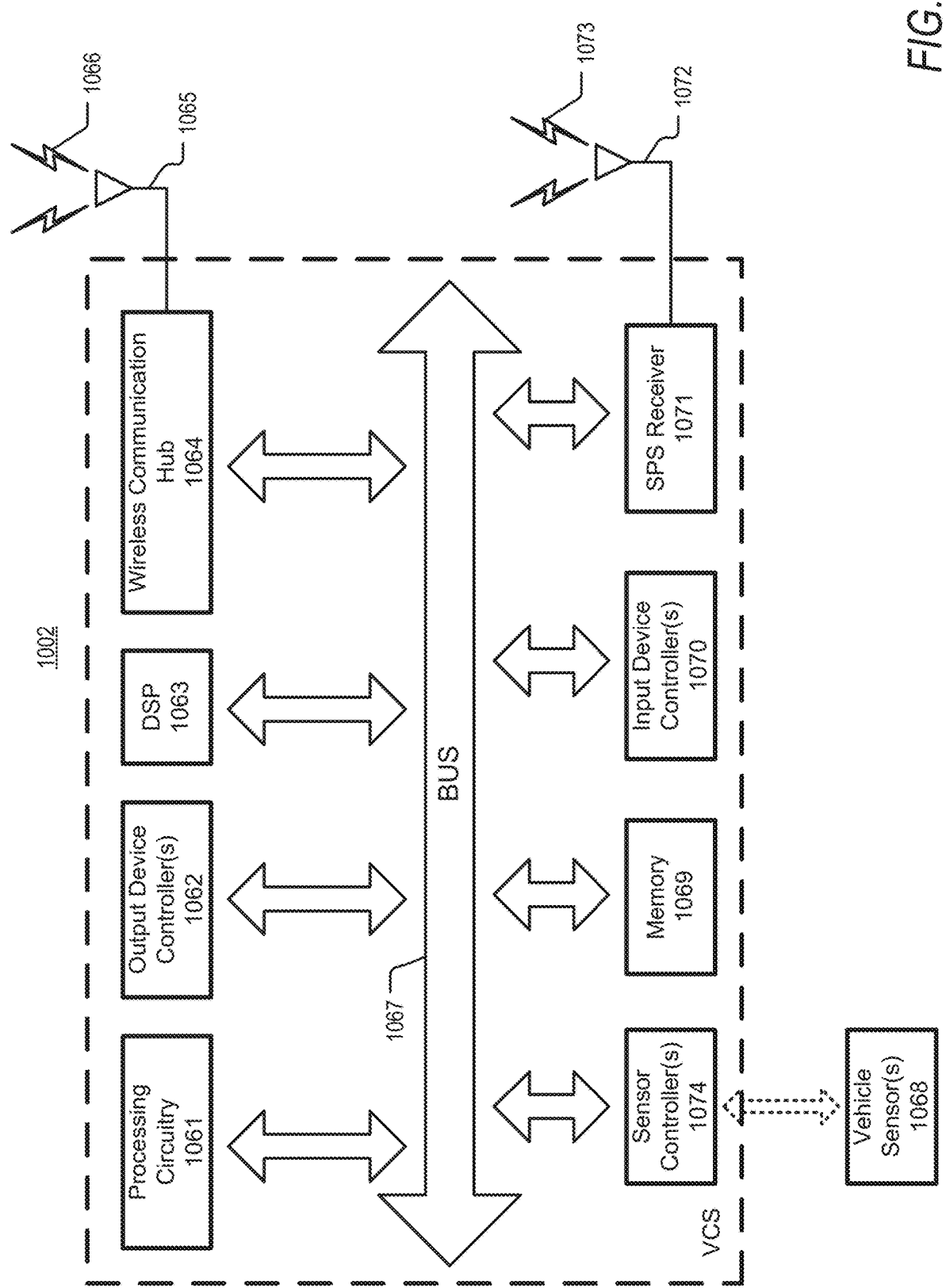
FIG. 10 is a block diagram of a vehicle control system, according to an exemplary embodiment of the present disclosure.

In order to operate accurately and with precision (i.e. determine the presence of an adverse condition of the vehicle environment), the SAV 201 can be outfitted with a plurality of external vehicle sensors 240, including, among others, one or more cameras 241, one or more surround view cameras 242, at least one radar (radio detection and ranging; herein "radar") 243, at least one LiDAR (light detection and ranging; herein "lidar") 244, at least one ultrasonic sensor 245, one or more corner radar 246, and at least one microphone 247. Data acquired from the plurality of external vehicle sensors 240 can be sent to an ECU of the VCS 202, comprising, among other components, processing circuitry(s), a storage medium, image processing circuitry(s), and communication circuitry(s), in order to be processed, locally and/or globally, and utilized in vehicle operation. In one embodiment, the VCS 202 can be, wholly, the ECU, or "electronic control unit", the ECU being used herein to describe any embedded system in automotive electronics that controls one or more electrical systems or subsystems in a vehicle, including, among others, a telematics control unit, an engine control module, and a powertrain control module. One implementation of the VCS 202 is illustrated in FIG. 10. The above-described plurality of external vehicle sensors 240 of the SAV 201 will be discussed in brief below.

Regarding the one or more cameras 241, the cameras may be positioned along a forward panel of the SAV 201 and arranged such that, in the case of a plurality of cameras, a parallax is created between the viewpoints. The parallax can be subsequently exploited, based upon the fixed geometric relationship between the viewpoints along the panel of the SAV 201, to determine a distance to an obstacle or impediment that may present an adverse condition. To this end, the one or more cameras 241 may provide monoscopic perspective or stereoscopic perspective. The one or more cameras 241 can employ, among other sensors, complementary metal-oxide-semiconductor (CMOS) image sensors.

Regarding the one or more surround view cameras 242, the surround view cameras may be positioned around the SAV 201 in order to create a parallax and to obtain a 3600 representation of the vehicle surroundings. As before, the parallax can be subsequently exploited, based upon the fixed geometric relationship between the viewpoints, in order to determine a distance to an obstacle or impediment that may present an adverse condition. The one or more surround view cameras 242 can employ, among other sensors, CMOS image sensors.

Regarding the above-described one or more cameras 241 and one or more surround view cameras 242, the output of the cameras 241, 242 can be further processed by the ECU of the VCS 202 to identify the vehicle surroundings and a condition of a vehicle environment. For instance, the image processing circuitry(s) of the ECU of the VCS 202 can perform one or more image classification operations on an output of the cameras 241, 242 in order to determine a condition of the vehicle environment, including determining whether the vehicle environment includes an adverse condition (e.g. an emergency vehicle or other distracting event is present outside the vehicle). The determination of the condition of the vehicle environment can also consider a proximity of the emergency vehicle or other distracting event, based on the one or more cameras 241, one or more surround view cameras 242, and the distancing means described below.

Regarding the at least one radar 243, the radar may be positioned along a forward panel of the SAV 201. The at least one radar 243 can be one selected from a group of radars including, among others, short range radar, medium range radar, and long range radar. In an embodiment, and as employed commonly in Adaptive Cruise Control and Automatic Emergency Braking Systems, the at least one radar 243 may be a long range radar with an operational range of, for example, a few hundred meters. The at least one radar 243 may be used to measure a distance between the SAV 201 and a preceding obstacle or impediment that may present an adverse condition.

Regarding the at least one lidar 244, the lidar may be positioned, for example, at a forward facing position and/or at a position with a 3600 viewpoint. The at least one lidar 244 can be an infrared lidar system using a rotating laser via a micro-electro-mechanical system, a solid-state lidar, or any other type of lidar. In one embodiment, the at least one lidar 244 can provide a 905 nm wavelength with up to a 300 meter operational range.

In an embodiment, radar and lidar may be interchangeable, mutatis mutandis.

Regarding the at least one ultrasonic sensor 245, the ultrasonic sensor may be disposed at corners of the SAV 201 for, in particular, short-range distancing. The at least one ultrasonic sensor 245 can be an ultrasonic sensor having asymmetric directivity (110°×50°), short ringing time and high sound pressure, sensitivity and reliability, and be configured to produce, among others, a 40 kHz, 48 kHz, 58 kHz, or 68 kHz nominal frequency as required by a respective situation.

Regarding the one or more corner radars 246, the radars can be substantially similar to the above-described at least one radar 243. Deployed as corner radars, the one or more corner radars 246 can be short range radar or medium range radar, as demanded, and can be broadband Frequency Modulated Continuous Wave radar.

In an embodiment, a combination of longitudinally-acquired (time-based) data from the above-described camera and distancing systems (radar and/or lidar, front cameras, ultrasonic) can be used to extract speed and outlines of obstacles and moving objects. The extracted outlines of the obstacles and moving objects may be used, in an embodiment, to detect and identify a distracting event, such as an emergency vehicle, roadkill, and the like, as an adverse condition of the vehicle environment.

Regarding the at least one microphone 247, the at least one microphone 247 can be a dynamic microphone, a condenser microphone, or a contact microphone. The at least one microphone 247 may be arranged on an exterior of the SAV 201 in order to acquire acoustic signals from the vehicle environment. The acoustic signals may be analyzed to determine the presence of a distracting event. For instance, acoustic signals received from the at least one microphone may be compared to reference acoustic signals associated with identifiable distracting events, such as emergency vehicles. Upon matching the received acoustic signals with one of the reference acoustic signals, a presence of an adverse condition within the vehicle environment may be determined. This process will be described in more detail with reference to FIG. 6A and FIG. 7A.

In an embodiment, the plurality of external vehicle sensors 240 may include components of a wireless communication unit. For instance, the wireless communication unit, which may include WiFi, Bluetooth, or other mobile communication modality, can be used to receive signals from neighboring vehicles (i.e. vehicle-to-vehicle communication). Such communication may be from an emergency vehicle that is self-identifying, the information therefrom being used in sub process 120 of method 100 to identify an adverse condition of the vehicle environment.

Of course, it can be appreciated by one of ordinary skill in the art that the above-described plurality of external vehicle sensors 240 do not constitute an exhaustive list and are merely exemplary of vehicle sensors that may be found on an SAV or other vehicle. In that context, any combination of vehicle sensors, described herein or not, can be integrated in order to achieve the function of the methods described herein.

Figure 3A:
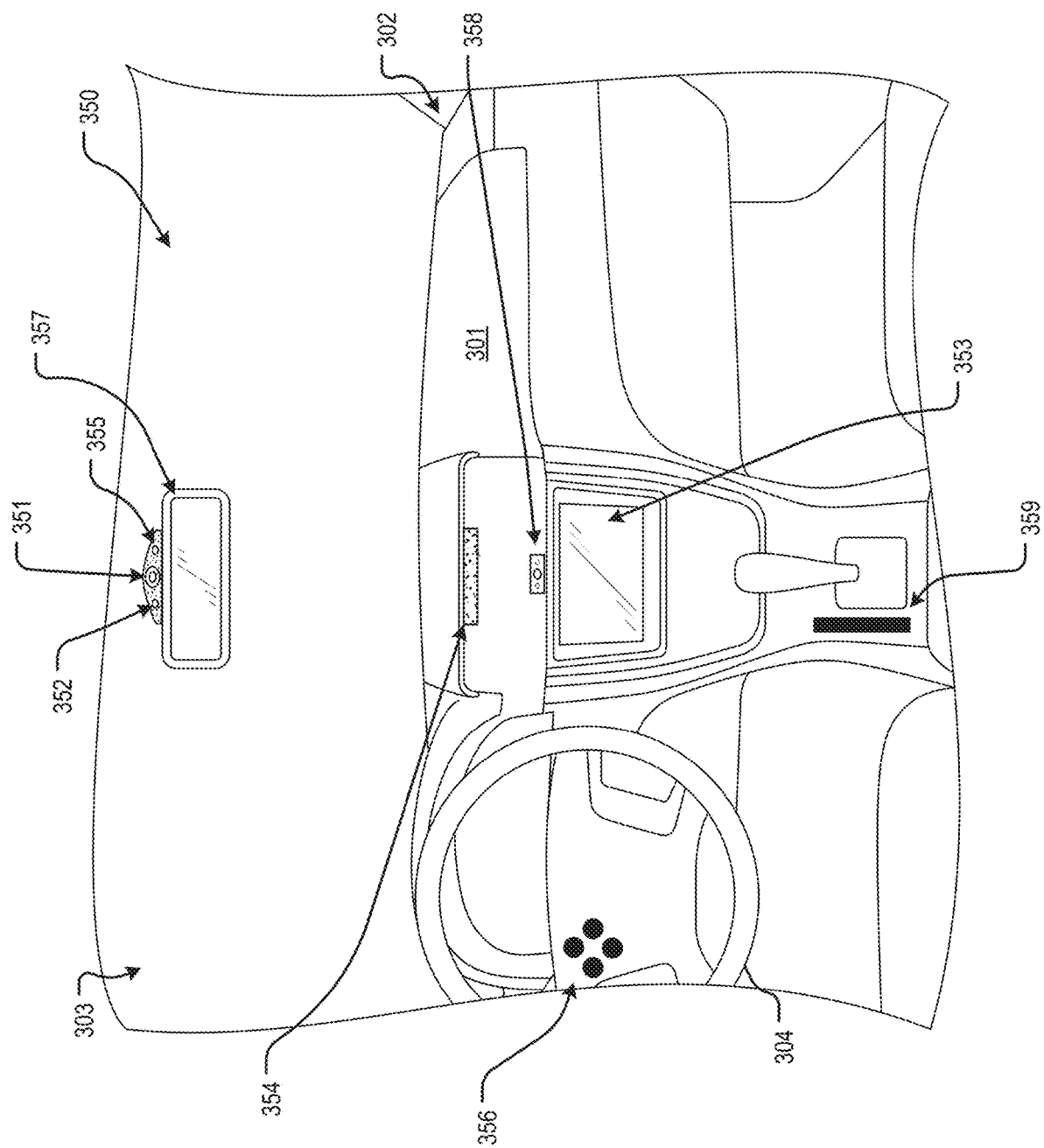
FIG. 3A is an illustration of an interior of a vehicle, according to an exemplary embodiment of the present disclosure.
Figure 3B:
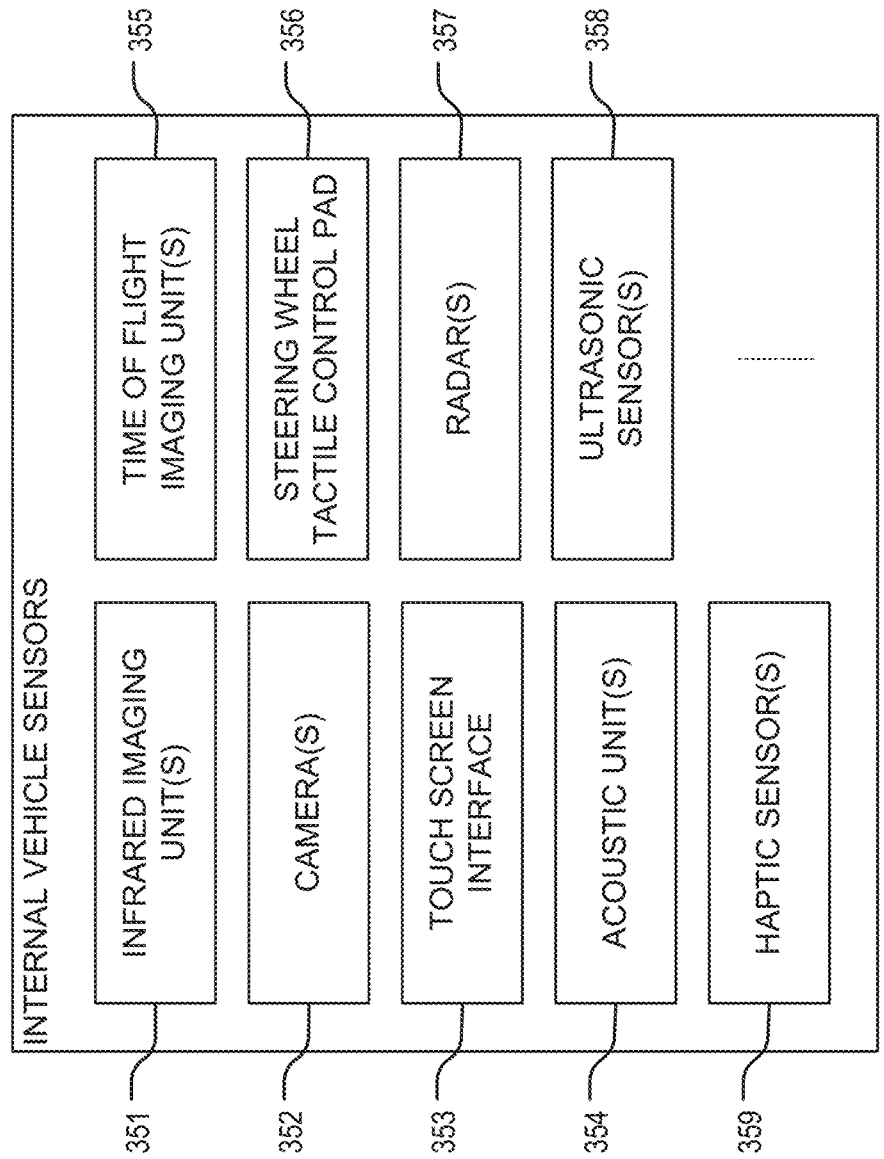
FIG. 3B is a description of internal sensors of a vehicle, according to an exemplary embodiment of the present disclosure.

FIG. 3A is an illustration of a cabin 303 of an SAV 301 deploying an HMI system(s) as part of a VCS 302, according to an exemplary embodiment of the present disclosure. The internal vehicle sensors described below can be further considered with reference to FIG. 3B.

In order to detect and receive driver requests, as well as to identify possible adverse conditions within the cabin of the vehicle environment, the cabin 303 of the SAV 301 can be outfitted with a plurality of internal vehicle sensors 350, including, among others, one or more infrared imaging units 351, one or more cameras 252, at least one touch screen interface 353, at least one acoustic unit 354, one or more time of flight imaging units 355, at least one haptic sensor 359, at least one steering wheel tactile pad 356, at least one ultrasonic sensor 358, and at least one radar 357. Data acquired from the plurality of internal vehicle sensors 350 can be sent to the ECU of the VCS 302, comprising, among other components, processing circuitry(s), a storage medium, image processing circuitry(s), and communication circuitry(s), in order to be processed, locally and/or globally, and utilized in vehicle operation. In one embodiment, the VCS 302 can be, wholly, the ECU, or "electronic control unit", the ECU being used herein to describe any embedded system in automotive electronics that controls one or more electrical systems or subsystems in a vehicle, including, among others, a telematics control unit, an engine control module, and a powertrain control module. One implementation of the VCS 302 is illustrated in FIG. 10.

In an embodiment, the embedded electrical systems and subsystems can include the module(s) of the HMI(s) of the present disclosure, including the eye tracking and gaze detection module, the voice recognition module, the tactile module, the gesture recognition module, and the like. The above-described module(s) and plurality of internal vehicle sensors 350 of the SAV 301 will be discussed in brief below.

Regarding the one or more infrared imaging units 351, which may include an infrared light emitter and an infrared camera, the one or more infrared imaging units 351 may be near-infrared imaging units and may be arranged such that a driver may be observed. As shown in FIG. 3A, the one or more infrared imaging units 351 may be positioned above a rear-view mirror, for instance. By arranging the one or more infrared imaging units 351 in proximity to a head of the driver, the one or more infrared imaging units 351, in combination with the ECU of the VCS 302, may be used within an eye tracking and gaze detection module to determine an orientation of an eyeball of the driver. Accordingly, during implementation of method 100, a confidence level of the one or more infrared imaging units 351 may be considered when determining if a subsequent driver input need be requested. For instance, the confidence level of the infrared imaging unit may suffer from vehicle vibrations that cause the data to be corrupted. Of course, the confidence level may also be a function of a processing on the data from the infrared imaging unit, the vibrations resulting in data that is unable to be processed. In an embodiment, data output from the one or more infrared imaging units 351 may be processed in order to identify adverse conditions within the cabin 303 of the vehicle environment. Cabin-based adverse conditions may include conditions that shift a focus of a driver from the road, such as a misbehaving child or noisy conversation. In an example, a gaze of the driver can be detected by the gaze detection module to determine a shift of the focus of the driver from the road.

Regarding the one or more cameras 352, the cameras may be positioned such that a driver may be observed. As shown in FIG. 3A, the one or more cameras 352 may be positioned above a rear-view mirror, for instance. In an embodiment, multiple cameras may be used and a parallax may be created between viewpoints. The parallax can be subsequently exploited, based upon the fixed geometric relationship between the viewpoints along the panel of the SAV 301, to determine a distance to features of the driver and in order to identify gestures. To this end, the one or more cameras 352 may provide monoscopic or stereoscopic perspective and may be part of the gesture recognition module, wherein longitudinal data of the cabin 303 of the SAV 301 allows for tracking of the driver. Accordingly, during implementation of method 100, a confidence level of the one or more cameras 352 may be considered when determining if a subsequent driver input need be requested. The one or more cameras 352 can employ, among other sensors, CMOS image sensors. For instance, the confidence level of the one or more cameras may suffer from poor cabin illumination that causes the data to be of little value. Of course, the confidence level may also be a function of a processing on the data from the one or more cameras, the poor cabin illumination resulting in data that is unable to be processed. In an embodiment, data output from the one or more cameras 352 may be processed in order to identify adverse conditions within the cabin 303 of the vehicle environment. Cabin-based adverse conditions may include a misbehaving child or a passenger that is not located in a proper seat, data from the one or more cameras 352 being processed to detect and locate the adverse condition.

In an embodiment, a position of the one or more infrared imaging units 351 and one or more cameras 352 is non-limiting and is described herein arranged at merely one position suitable for obtaining the desired information related to the driver.

Regarding the touch screen interface 353, which may be a component of the tactile module, the touch screen interface 353 may include, among other components, a display having a resistive touchscreen panel, a capacitive touchscreen panel, or a panel employing surface acoustic wave. The touch screen interface 353 may be positioned in the center console of the cabin 303 of the SAV 301 and within comfortable reach of the driver. During implementation of method 100, a confidence level of the touch screen interface 353, which may receive tactile input from the driver regarding a requested action, can be considered when determining if a subsequent driver input need be requested. For instance, due to vehicle vibrations, a location of a driver interaction with the display of the touch screen interface 353 may be proximate to another, different portion of the touch screen interface 353 associated with a different action of the vehicle. Accordingly, a confidence with which the requested input is determined may be low, relative to a confidence threshold, and may necessitate requesting a subsequent driver input.

Regarding the haptic sensor(s) 359, which may be a component of the tactile module, the haptic sensor(s) 359 may include, among other components, a pressure-sensitive pad, a capacitive panel, or a panel employing surface acoustic wave. The haptic sensor(s) 359 may be positioned in the center console of the cabin 303 of the SAV 301 and within comfortable reach of the driver. During implementation of method 100, a confidence level of the haptic sensor(s) 359, which may receive haptic input from the driver regarding a requested action, can be considered when determining if a subsequent driver input need be requested. For instance, due to vehicle vibrations, a location of a driver interaction with the haptic sensor(s) 359 may be proximate to another, different portion of the haptic sensor(s) 359 associated with a different action of the vehicle. Accordingly, a confidence with which the requested input is determined may be low, relative to a confidence threshold, and may necessitate requesting a subsequent driver input.

Regarding the at least one ultrasonic sensor 358, which may be part of the gesture recognition module, the ultrasonic sensor may be disposed above the touch screen interface 353 of the SAV 201 for, in particular, short-range distancing and identification of user gestures corresponding to requested actions The at least one ultrasonic sensor 358 can be an ultrasonic sensor having asymmetric directivity (110°×50°), short ringing time and high sound pressure, sensitivity and reliability, and be configured to produce, among others, a 40 kHz, 48 kHz, 58 kHz, or 68 kHz nominal frequency as required by a respective situation. In an embodiment, data output from the at least one ultrasonic sensor 358 may be processed in order to identify adverse conditions within the cabin 303 of the vehicle environment.

Regarding the at least one acoustic unit 354, which may be a component of the voice recognition system, each of the at least one acoustic unit 354 may include a microphone(s) and a speaker(s), the microphone(s) and the speaker(s) being used to receive driver input and request driver input, respectively. The microphone(s) of the acoustic unit(s) 354 can be one or more of a dynamic microphone, a condenser microphone, and a contact microphone. The microphone(s) can be arranged along the center console of the cabin 303 of the SAV 301 and within range of the driver of the SAV 301. In one instance, the microphone(s) may be a single microphone, and in another instance, the microphone(s) can be a plurality of microphones arranged in a microphone array. In an embodiment, the microphone(s) may be directional microphones and may be configured to selectively receive acoustic input from the driver of the vehicle. During implementation of method 100, a confidence level of the at least one acoustic unit 354, which may receive acoustic input from the driver regarding a requested action, can be considered when determining if a subsequent driver input need be requested. For instance, environmental noise can obfuscate the acoustic signal provided to the at least one acoustic unit 354. In another instance, processing of the acoustic signal, including natural language processing within the voice recognition module, may not be able to generate a confident result from the signal received by the at least one acoustic unit 354, and a subsequent input modality may be required. In an embodiment, data output from the at least one acoustic unit 354 may be processed in order to identify adverse conditions within the cabin 303 of the vehicle environment. Cabin-based adverse conditions may include misbehaving children, the at least one acoustic unit 354 being configured to obtain audio samples from the cabin 303 of the vehicle environment and process the audio samples to identify the presence of a misbehaving child (e.g., elevated voice, change in pitch, specific acoustic signatures).

Regarding the one or more time of flight imaging units 355, which may be a component of the eye tracking and gaze detection module and/or the gesture recognition module, the time of flight imaging units may include an illumination unit and a time-of-flight image sensor. Use of the one or more time of flight imaging units 255 allows for digital rendering of a scene of the cabin 303 of the SAV 301 and determination of movements of body parts of the driver. As such, data from the one or more time of flight imaging units 355 can be used within the gesture recognition module and the eye tracking and gaze detection module. In an embodiment, data output from the one or more time of flight imaging units 355 may be processed in order to identify adverse conditions within the cabin 303 of the vehicle environment. Cabin-based adverse conditions may include conditions that shift a focus of a driver from the road, such as a misbehaving child or noisy conversation. In an example, a gaze of the driver can be detected by the gaze detection module to determine a shift of the focus of the driver from the road.

In an embodiment, the time of flight image sensor may be a three-dimensional (3D) time of flight image sensor, or camera, configured to receive reflected light emitted from the illumination unit as a modulated light source. A phase shift between the emitted light and the reflected light can be measured and converted to distance. Typically, the illumination unit is a solid-state laser or a light-emitting diode operating in the near-infrared spectrum and configured to generate wavelengths of 850 nm or 940 nm, for example. The 3D time of flight image sensor may be designed to respond to the same light spectrum and convert the photonic energy to electrical charges. As shown in FIG. 3A, the one or more time of flight imaging units 355 may be positioned proximate the rear-view mirror and arranged in order to capture the scene of the cabin 303 of the SAV 301, including the driver and other occupants. A primary purpose of the time of flight image sensor, as a 3D time of flight image sensor, is to acquire 3D data of the cabin 303 of the SAV 301 as point cloud data that holds information of the position of the objects they are representing (e.g., x, y, and z coordinates). Accordingly, a position of the objects over time may be determined and tracked.

As the one or more time of flight imaging units 355 can acquire 3D data of the cabin 303 of the SAV 301, a confidence level of the time of flight image sensor can be considered during implementation of method 100 in determining whether a requested action of a driver should be performed or if a subsequent driver input need be requested via subsequent input modality. For instance, the confidence level of the time of flight image sensor may suffer from vehicle vibrations that cause the data to be corrupted. Of course, the confidence level may also be a function of a processing on the data from the time of flight image sensor, the vibrations resulting in data that is unable to be processed or of low data fidelity.

Regarding the steering wheel tactile pad 356, which may be a component of the tactile module, the steering wheel tactile pad may be, among others, a control pad that requires depression of button, by the driver, to input a requested action. As each driver input described above can correspond to an action, each button of the control pad may be associated with a different action requestable by the driver. The steering wheel tactile pad 356 may be positioned in the center of a steering wheel 304 of the SAV 301 and within comfortable reach of the driver. During implementation of method 100, a confidence level of the steering wheel tactile pad 356, which may receive tactile input from the driver regarding a requested action, can be considered when determining if a subsequent driver input need be requested. For instance, a magnitude of a depression of a button of the steering wheel tactile pad 356 may be insufficient, due to an accidental touch or road vibrations, to generate a confident output, and so a subsequent driver input may be requested.

Regarding the at least one radar 357, the radar may be positioned around a periphery of a rear-view mirror of the SAV 301. The at least one radar 357 can be one selected from a group of radars including, among others, short range radar, medium range radar, and long range radar. In an embodiment, the at least one radar 357 may be a short range radar and may be used to measure a distance to a driver of the SAV 301. In an embodiment, data output from the at least one radar 357 may be processed in order to identify adverse conditions within the cabin 303 of the vehicle environment.

In an embodiment, a combination of longitudinally-acquired (time-based) data from the above-described camera and radar systems can be used to extract speed and outlines of the driver and of passengers of the SAV 301. The extracted outlines of the driver may be used, in an embodiment, to detect and identify a gesture of the driver. In another embodiment, the extracted outlines of the passengers of the SAV 301 may be used to detect and identify an adverse condition within the cabin 303 of the SAV 301.

Of course, it can be appreciated by one of ordinary skill in the art that the above-described plurality of internal vehicle sensors 350 do not constitute an exhaustive list and are merely exemplary of vehicle sensors that may be found on an SAV or other vehicle. In that context, any combination of vehicle sensors, described herein or not, can be integrated in order to achieve the function of the methods described herein.

Having described the vehicle sensors used for performing the steps and sub processes of method 100, the method 100 will now be described with reference to the flow diagram of FIG. 4.

Figure 4:
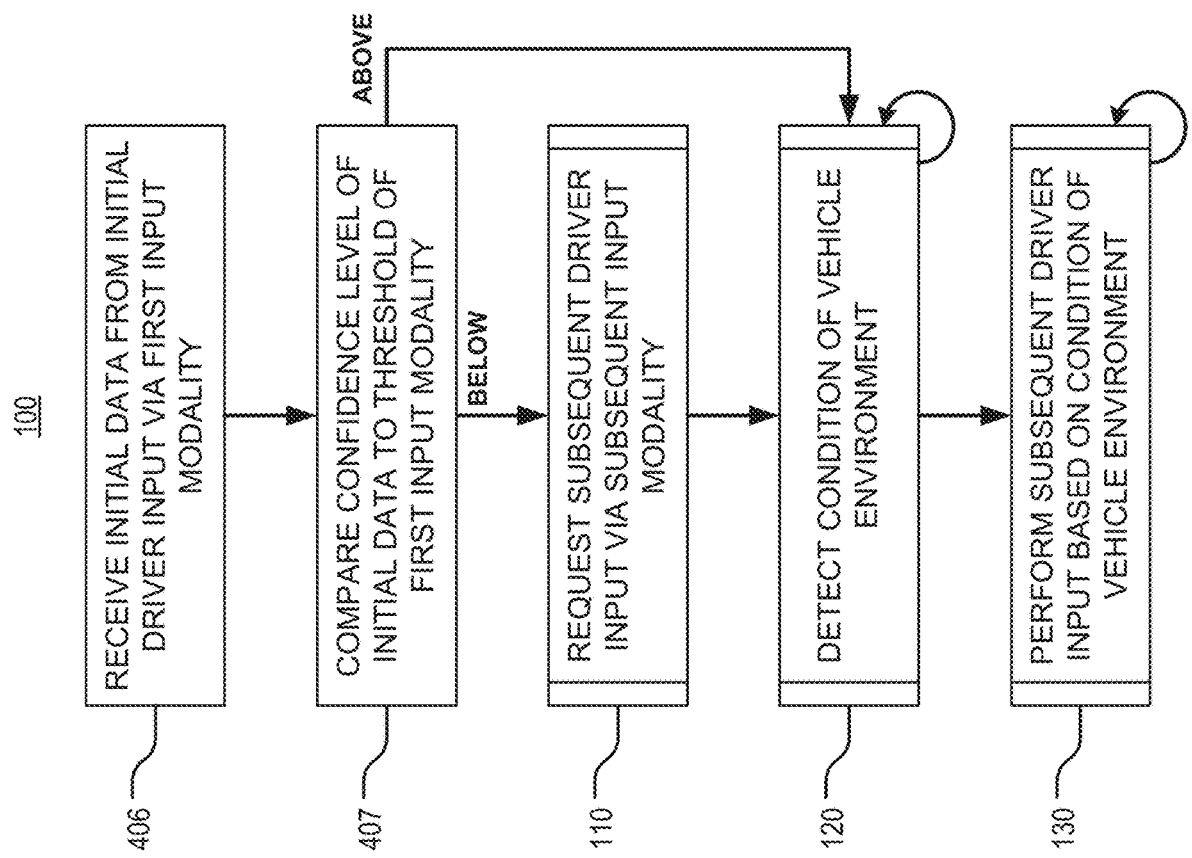
FIG. 4 is a flow diagram of a method of performing an input of a driver of a vehicle, according to an exemplary embodiment of the present disclosure.

The flow diagram of FIG. 4 describes step 105 of method 100 as two separate steps. Accordingly, at step 406 of method 100, initial input data corresponding to an initial driver input may be received by an ECU of the SAV from an initial input modality. A reliability of the initial driver input via the initial input modality can be evaluated at step 407 of method 100. The evaluation may include a comparison of a confidence level of a vehicle sensor(s) associated with the initial input modality and a threshold confidence level of the vehicle sensor(s). For instance, when the initial input modality is via the voice recognition module, the evaluation may determine that a confidence level of a microphone(s) or other acoustic unit(s) associated with the voice recognition module is below a threshold confidence level required for continued processing. This may be the result of, among other things, increased background noise during high speed travel or during precipitation events.

If the evaluation determines, at step 407 of method 100, the reliability of the initial driver input via the initial input modality is sufficient (i.e. confidence level at or above threshold), method 100 may proceed to sub process 120. Such flow of method 100 will be described in greater detail with reference to FIG. 6A and FIG. 6B.

Alternatively, if the evaluation at step 407 of method 100 determines the reliability of the initial driver input via the initial input modality is insufficient (i.e. confidence level below threshold), method 100 proceeds to sub process 110 and a subsequent driver input is requested via a subsequent input modality. The subsequent input modality is one selected, by the ECU, from a plurality of input modalities, the selection being based on confidence levels of associated vehicle sensor(s) and/or data processing of the input modalities. Though simply described here as a method of selecting the subsequent input modality in order to obtain a reliable driver input, sub process 110 will be described in greater detail with reference to FIG. 5.

After requesting the subsequent driver input and receiving the subsequent driver input via the subsequent input modality, sub process 120 of method 100 determines a condition of a vehicle environment, which may include an exterior of the vehicle and/or an interior of the vehicle that, in part, determines if an action associated with the subsequent driver input should be performed. The vehicle condition determination can include, among other things, a detection of an adverse condition of a road environment surrounding the vehicle. In an embodiment, the adverse condition may be an emergency vehicle or other distracting event, such as a weather event and the like. The vehicle condition determination may also be a detection of an adverse condition within a cabin of the vehicle. The adverse condition of the cabin environment inside the vehicle may be an upset child and the like. The determination of the condition of the vehicle environment, along with the subsequent driver input received at sub process 110 of method 100, may be output from sub process 120 of method 100.

Accordingly, sub process 130 of method 100 receives the determination of the condition of the vehicle environment and the subsequent driver input from sub process 110 of method 100. If the output indicates the condition of the vehicle environment is determined to be an adverse condition, sub process 130 of method 100 can be iteratively performed until the adverse condition has subsided and the output from sub process 120 of method 100 indicates the same. Concurrently, and to avoid later requesting additional input from the driver, the subsequent driver input can be stored in a database until the adverse condition has subsided and the action associated with the subsequent driver input can be safely performed.

Upon receiving the output indicating the adverse condition has subsided and the vehicle condition is determined to be a normal condition (i.e. no adverse condition detected within the cabin of the vehicle and/or within the road environment surrounding the vehicle), the action associated with the subsequent driver input can be performed. The action can be, for instance, an increase in audio volume of the music playback.

As described above, in receiving the output indicating detection of the adverse condition, the ECU may determine that an action associated with a subsequent driver input should not be immediately performed at sub process 130 of method 100, as performing the action may distract the driver from operating the vehicle. Accordingly, the subsequent driver input can be stored in the database and readily accessed when appropriate. In this way, the ECU allows the driver to focus on the activity of driving the vehicle without distraction. Moreover, by recognizing the driver-requested action but not acting on the driver-requested action, the ECU does not require further input from the driver.

With reference now to FIG. 5, sub process 110 of method 100 will be further described. Sub process 110 of method 100 of FIG. 5 provides a flow diagram describing selection of a subsequent input modality from which a subsequent driver input should be requested following detection and identification of an adverse condition within the vehicle environment.

At step 511 of sub process 110, data from each of a plurality of internal vehicle sensors of the SAV is received. The data can be data delivered directly from the plurality of internal vehicle sensors or data processed by the ECU according to processes associated with each of the plurality of internal vehicle sensors. The plurality of internal vehicle sensors can be, among others, those described above with reference to FIG. 3A and FIG. 3B.

At step 512 of sub process 110, the received data can be evaluated relative to respective confidence thresholds.

For instance, as it relates to an eye tracking and gaze detection module, a confidence level of data from an infrared imaging unit associated with the eye tracking and gaze detection module or a confidence level of processed data from the infrared imaging unit associated with the eye tracking and gaze detection module may be evaluated. Regarding the confidence level of data from the infrared imaging unit, a confidence level of the infrared detector or infrared camera can be compared to a threshold confidence level associated with the infrared detector or infrared camera. Regarding the confidence level of processed data from the infrared imaging unit, a confidence level of the processed data can be based on an ability to detect and identify the head and/or eyeballs of the driver and to determine orientation and movement, thereof, within obtained infrared images. Such confidence level of the processed data can be impacted by movements of the head of the user and the visibility of features of the head or eyeballs within the field of view of the infrared imaging unit. A result of the evaluation of the eye tracking and gaze detection module may be a confidence level of the data or of the processed data relative to respective confidence levels. For simplicity, the result of the evaluation at step 512 of sub process 110 may be a confidence level of the processed data from the infrared imaging unit normalized to a threshold confidence level associated with data processing associated with the infrared imaging unit.

As it relates to a voice recognition module, a confidence level of data from a microphone(s) associated with the voice recognition module or a confidence level of processed data from the microphone(s) associated with the voice recognition module may be evaluated. Regarding the confidence level of data from the microphone(s), a confidence level of the microphone(s) can be compared to a threshold confidence level associated with the microphone(s). Regarding the confidence level of processed data from the microphone(s), a confidence level of the processed data can be based on an ability to detect and identify linguistic units of words spoken by the driver. In other words, the confidence level of the processed data from the microphone(s) is a confidence level associated with a speech recognition engine configured to process the received acoustic data. The confidence level of the data from the microphone(s) can be impacted by self-noise or other sources of electromagnetic noise. The confidence level of the processed data can be impacted by increased noise within the sound field of the cabin of the SAV, speech accents that are not anticipated, road noise, and the like. A result of the evaluation of the voice recognition module may be a confidence level of the data or the processed data relative to respective confidence levels. For simplicity, the result of the evaluation at step 512 of sub process 110 may be a confidence level of the processed data from the microphone(s) normalized to a threshold confidence level associated with data processing associated with the microphone(s).

As it relates to a tactile module, a confidence level of data from a touch screen interface, a confidence level of data from haptic sensor(s), and/or a steering wheel tactile pad associated with the tactile module or a confidence level of processed data from the touch screen interface and/or steering wheel tactile pad associated with the tactile module may be evaluated. Regarding the confidence level of data from the touch screen interface, the haptic sensor(s), and/or steering wheel tactile pad, a confidence level of the touch screen interface, the haptic sensor(s), and/or steering wheel tactile pad can be compared to a threshold confidence level associated with the touch screen interface, the haptic sensor(s), and/or steering wheel tactile pad. The confidence level of the touch screen interface, the haptic sensor(s), and/or steering wheel tactile pad may be based on a magnitude of electrical energy generated by contact with the touch screen interface, contact with the haptic sensor(s), or depression of a button of the steering wheel tactile pad, the threshold confidence level being that which confirms an intended interaction therewith. Regarding the confidence level of processed data from the touch screen interface, the haptic sensor(s), and/or steering wheel tactile pad, a confidence level of the processed data can be based on an ability to confirm an intention of the driver input. In other words, the confidence level of the processed data from the touch screen interface, the haptic sensor(s), and/or steering wheel tactile pad is a confidence level associated with a location of the driver interaction with the touch screen interface, the haptic sensor(s), and/or steering wheel tactile pad. If, as in the case of the touch screen interface, the location of the driver interaction is near the edge of an area of a display of the touch screen interface corresponding to an action, the confidence level of the processed data may be reduced. The confidence level of the data from the touch screen interface, the haptic sensor(s), and/or steering wheel tactile pad can be impacted by self-noise or other sources of electromagnetic noise. The confidence level of the processed data can be impacted by increased motion of the SAV and motion of the driver, thereby causing the interaction with the touch screen interface, the haptic sensor(s), and/or steering wheel tactile pad to be misaligned. A result of the evaluation of the tactile module may be a confidence level of the data or the processed data relative to respective confidence levels. For simplicity, the result of the evaluation at step 512 of sub process 110 may be a confidence level of the processed data from the touch screen interface, the haptic sensor(s), and/or steering wheel tactile pad normalized to a threshold confidence level associated with data processing associated with the touch screen interface, the haptic sensor(s), and/or steering wheel tactile pad.

As it relates to a gesture recognition module, a confidence level of data from a radar, a time of flight imaging unit(s), at least one ultrasonic sensor(s), or cameras associated with the gesture recognition module or a confidence level of processed data from the radar, the time of flight imaging unit(s), at least one ultrasonic sensor(s), or the cameras associated with the gesture recognition module may be evaluated. So that it may be easily understood, the gesture recognition module will be described with reference to data acquired by the time of flight imaging unit(s). Regarding the confidence level of data from the time of flight imaging unit(s), a confidence level of a time of flight image sensor(s) can be compared to a threshold confidence level associated with the time of flight image sensor(s). Regarding the confidence level of processed data from the time of flight image sensor(s), a confidence level of the processed data can be based on an ability to detect and identify features of a body of a driver and movements, thereof. In other words, the confidence level of the processed data from the time of flight image sensor(s) is a confidence level associated with an image recognition engine configured to process the received image data from the time of flight image sensor(s). The confidence level of the processed data can be impacted by inadequate resolution of the time of flight image sensor(s), relative to movements of the driver, and by excessive road vibrations that lead to excessive and unintentional movement of the body of the driver. A result of the evaluation of the gesture recognition module may be a confidence level of the data or the processed data relative to respective confidence levels. For simplicity, the result of the evaluation at step 512 of sub process 110 may be a confidence level of the processed data from the time of flight image sensor(s) normalized to a threshold confidence level associated with image processing associated with the microphone(s).

In order to determine which of the plurality of internal vehicle sensors should be selected as the subsequent input modality, the relative confidence levels of the plurality of internal vehicle sensors of the SAV may be ordered at step 513 of sub process 110. The ordering may be a ranking, with the highest normalized confidence vehicle sensor being ordered as 1. The 'highest normalized confidence vehicle sensor' may be considered one that has the largest normalized value following normalizing the confidence level of the unprocessed data or processed data to a threshold confidence level of the unprocessed data or processed data. In other words, the vehicle sensor or input modality that has the highest margin of confidence should be ranked 1.

In this way, following a determination that the initial input modality is not sufficient a subsequent input modality can be selected according to real-time confidence levels of potential input modalities. In an embodiment, the data used to develop the above-described rankings can be data that populates a first in first out buffer, the buffer configured to store a limited amount of data and existing only to calculate the normalizations.

Accordingly, the input modality, or input modality associated with the vehicle sensor, ranked highest at step 513 of sub process 110 may be selected as the subsequent input modality at step 514 of sub process 110. Referring to method 100 of FIG. 1 and FIG. 4, the selected input modality may then be used to request a subsequent input of the driver.

Figure 6A:
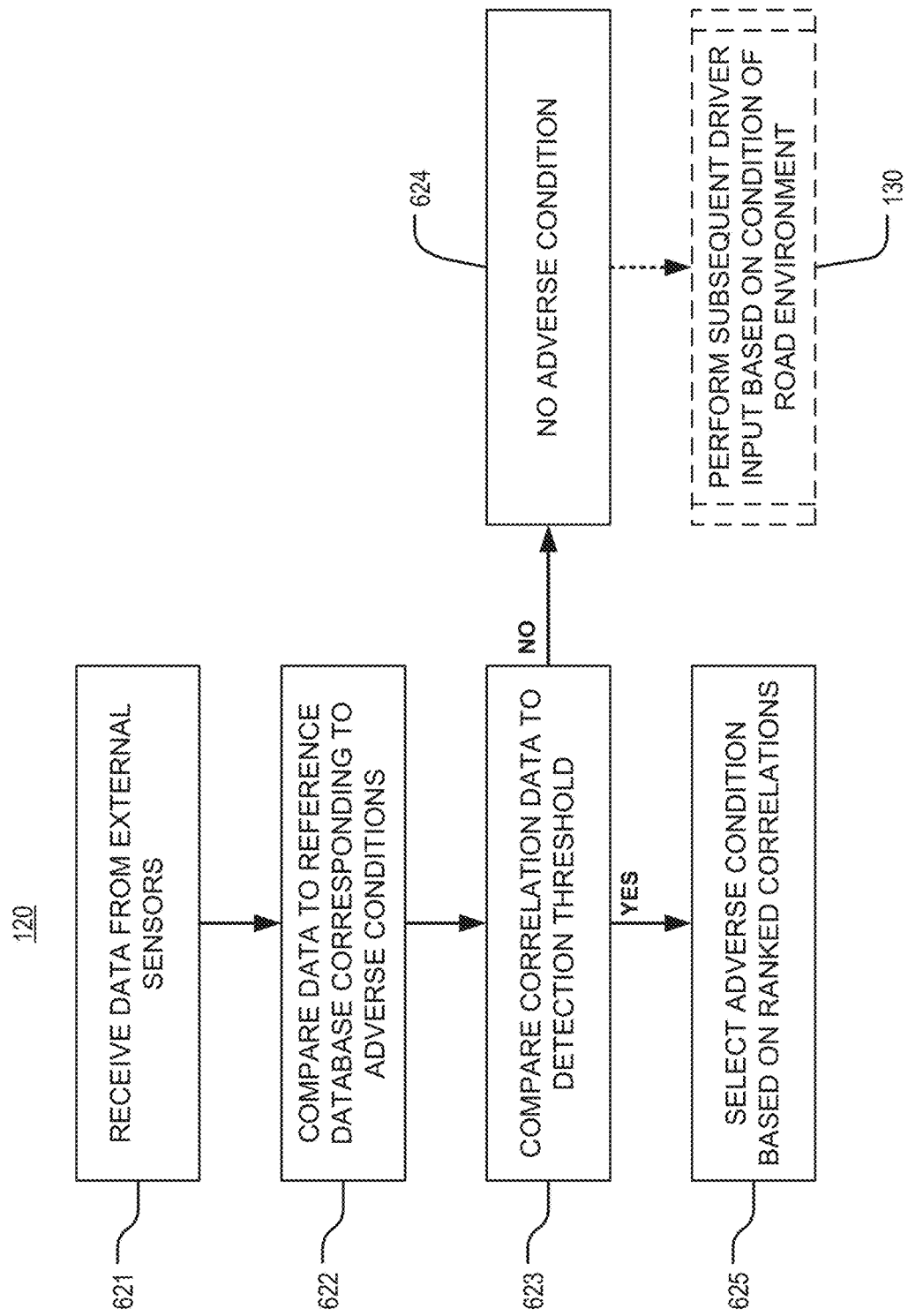
FIG. 6A is a flow diagram of a sub process of a method of performing an input of a driver of a vehicle, according to an exemplary embodiment of the present disclosure.

With reference now to FIG. 6A, sub process 120 of method 100 will be further described. Sub process 120 of method 100 of FIG. 6A provides a flow diagram describing determining a condition of a road of a vehicle environment of the SAV, according to an exemplary embodiment of the present disclosure. As noted above, sub process 120 of method 100 may be performed independently of whether the initial driver input or the subsequent driver input is used. For simplification, and as a continuation of FIG. 4 and FIG. 5, FIG. 6A will be discussed assuming a subsequent driver input has been requested and received.

At step 621 of sub process 120, data may be received from the plurality of external vehicle sensors. The plurality of external vehicle sensors, described with respect to FIG. 2A and FIG. 2B, can include camera(s), surround view camera(s), radar(s), lidar(s), ultrasonic sensor(s), corner radar(s), microphone(s), and the like.

At step 622 of sub process 120, the data received from each of the plurality of external vehicle sensors can be compared to reference data, corresponding to a respective external vehicle sensor, from within a reference database including data associated with adverse conditions. As described above with reference to the input modalities of FIG. 5, the data received from each of the plurality of external sensors may be unprocessed data and/or processed data. In other words, in the case of acoustic data acquired by microphone(s), the acoustic data can be directly compared, unprocessed, with reference data from the reference database or may be compared, after processing, which may include a filter and the like, with reference data from the reference database.

In this way, data received from each of the plurality of external vehicle sensors can be used to determine the condition of the road of the vehicle environment and to identify adverse conditions, if present. The adverse conditions may include, among others, the presence of emergency vehicles, weather events resulting in reduced visibility and/or reduced vehicle traction, and heavy traffic.

In an embodiment, one of the plurality of external vehicle sensors may be a microphone(s). The comparison at step 622 of sub process 120 may be between an acoustic signal received by the microphone(s) and reference data corresponding to, for example, sounds emitted by an emergency vehicle. The reference data, which may be associated with an ambulance, a police vehicle, or a fire engine, as the emergency vehicle, can include an acoustic signature corresponding to each. Accordingly, the comparison at step 622 of sub process 120 may be between the acoustic signal received at the microphone(s) and the reference data associated with each of the emergency vehicles. An output of the comparison may be a correlation value reflecting a similarity between the acoustic signal received by the microphone(s) and respective reference data.

In another embodiment, one of the plurality of external vehicle sensors may be a camera(s). In order to perform the comparison between an image acquired by the camera(s) and reference data including images corresponding to, for example, wildlife, image processing may be performed to identify features of the image. The image processing may be, in an example, semantic image segmentation. Accordingly, reference images of wildlife may be similarly processed prior to comparison with the image acquired by the camera(s). In an embodiment, the image acquired by the camera(s) may be processed according to semantic image segmentation and then the wildlife may be extracted from the image prior to comparison with reference images. In this way, an output of the comparison may be correlations between the animal, for instance, of the image acquired by the camera and each of the reference images of wildlife. It can be appreciated that other approaches may be used, keeping with the spirit of the invention, such as neural networks trained in image classification.

In another embodiment, one of the plurality of external vehicle sensors may be a camera(s). In order to perform the comparison between an image acquired by the camera(s) and reference data including images corresponding to, for example, pedestrians, image processing may be performed to identify features of the image. The image processing may be, in an example, semantic image segmentation. Accordingly, reference images including pedestrians walking on sidewalks and across crosswalks may be similarly processed prior to comparison with the image acquired by the camera(s). In an embodiment, the image acquired by the camera(s) may be processed according to semantic image segmentation and then the pedestrians may be extracted from the image prior to comparison with reference images. In this way, an output of the comparison may be correlations between the pedestrian, for instance, of the image acquired by the camera and each of the reference images including pedestrians. It can be appreciated that other approaches may be used, keeping with the spirit of the invention, such as neural networks trained in image classification.

Following comparison of the data from each of the plurality of external vehicle sensors and the reference data from the reference database, correlations can be compared to respective detection thresholds at step 623 of sub process 120. By comparing each correlation value to a respective detection threshold, sub process 120 ensures that conditions of the road of the vehicle environment are detected and identified with confidence. For instance, if no adverse condition is sufficiently correlated with the data from the plurality of external vehicle sensors (i.e. correlation value above detection threshold), no adverse condition is detected. Accordingly, method 100 may proceed to sub process 130 via step 624 of sub process 120 and the action corresponding to the subsequent driver input can be performed.

Alternatively, if it is determined that one or more of the data from the plurality of external vehicle sensors are sufficiently correlated with at least one reference data from the reference database, sub process 120 may proceed to step 625, wherein the correlation values associated with each of the sufficiently correlated pairs are ranked. As with step 614 of sub process 110 of FIG. 5, the correlation values may be normalized relative to respective detection thresholds and then ranked such that the most confident correlations are highly ranked. In this way, the most highly ranked normalized correlation value can be selected as the adverse condition present in the road of the vehicle environment.

This ranking system allows for confident identification of adverse conditions. For instance, a vehicle traveling at dusk may be unable to confidently identify an elk using cameras. However, an acoustic evaluation of the road environment, by acoustic units and/or ultrasonic units, would be able to determine that the elk is present in the road of the vehicle environment.

Figure 6B:
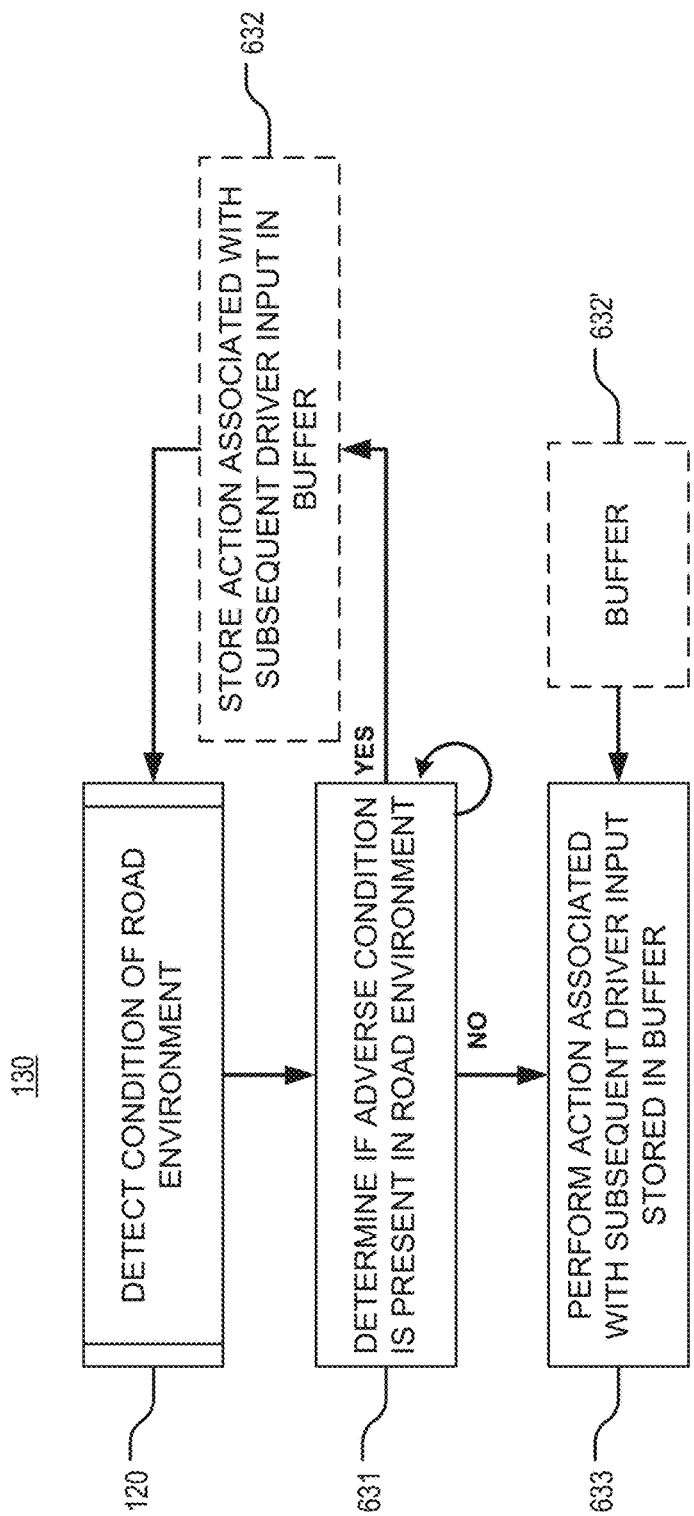
FIG. 6B is a flow diagram of a sub process of a method of performing an input of a driver of a vehicle, according to an exemplary embodiment of the present disclosure.

With reference now to FIG. 6B, the output of sub process 120 of method 100 can be passed to sub process 130 of method 100.

At step 631 of sub process 130, the output of sub process 120 of method 100 can be evaluated to determine if an adverse road condition is present. If the output of sub process 120 of method 100 initially indicates that no adverse condition is present in the road of the vehicle environment, sub process 130 proceeds to step 633, bypassing step 632 of sub process 130. However, if the output of sub process 120 of method 100 initially indicates that an adverse condition, such as a police vehicle, is present in the road of the vehicle environment, step 631 of sub process 130 is iteratively performed and, concurrently, an action associated with the subsequent driver input is stored in a buffer at step 632 of sub process 130. The buffer may be later accessed when it is determined the adverse condition is no longer present, in order to perform the action corresponding to the subsequent driver input.

Following iterative performance of step 631 of sub process 130, it may be determined that the adverse condition detected at sub process 120 of method 100 is no longer present in the road of the vehicle environment. Accordingly, sub process 130 may proceed to step 633 and the action associated with the subsequent driver input can be performed. As indicated above, the action associated with the subsequent driver input can be one that is stored in buffer and acquired at step 632', thereby eliminating the need to repeatedly query the driver and request the input be provided.

Figure 7A:
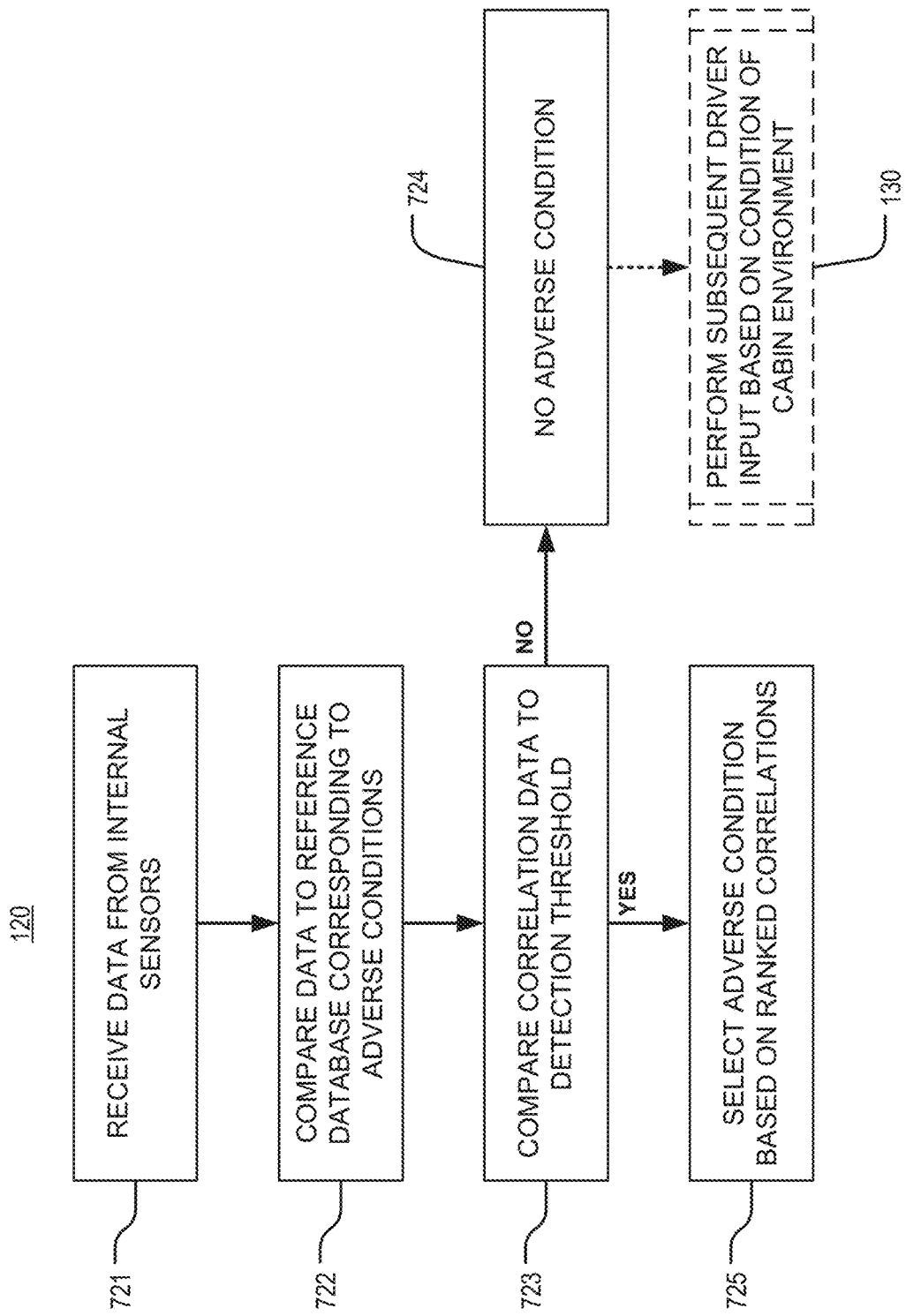
FIG. 7A is a flow diagram of a sub process of a method of performing an input of a driver of a vehicle, according to an exemplary embodiment of the present disclosure.

With reference now to FIG. 7A, sub process 120 of method 100 will be further described. Sub process 120 of method 100 of FIG. 7A provides a flow diagram describing determining a condition of a cabin of a vehicle environment of the SAV, according to an exemplary embodiment of the present disclosure. In this way, an attentiveness of the driver can be evaluated and requested actions can be performed, accordingly and as safe, thereby minimizing driver distractions. As noted above, sub process 120 of method 100 may be performed independently of whether the initial driver input or the subsequent driver input is used. For simplification, and as a continuation of FIG. 4 and FIG. 5, FIG. 7A will be discussed assuming a subsequent driver input has been requested and received.

At step 721 of sub process 120, data may be received from the plurality of internal vehicle sensors. The plurality of internal vehicle sensors, described with respect to FIG. 3A and FIG. 3B, can include camera(s), infrared imaging unit(s), radar(s), time of flight imaging unit(s), ultrasonic sensor(s), touch screen interface(s), haptic sensor(s), tactile control pad(s), microphone(s), and the like.

At step 722 of sub process 120, the data received from each of the plurality of internal vehicle sensors can be compared to reference data, corresponding to a respective internal vehicle sensor, from within a reference database including data associated with adverse conditions. As described above with reference to the input modalities of FIG. 5, the data received from each of the plurality of internal sensors may be unprocessed data and/or processed data. In other words, in the case of acoustic data acquired by microphone(s), the acoustic data can be directly compared, unprocessed, with reference data from the reference database or may be compared, after processing, which may include a filter and the like, with reference data from the reference database.

In this way, data received from each of the plurality of internal vehicle sensors can be used to determine the condition of the cabin of the vehicle environment and to identify adverse conditions, if present. The adverse conditions may include, among others, a generally inattentive driver or unbuckled children, rear passengers engaged in conversation, or the presence of storage containers that prevent driver awareness of the vehicle surroundings.

In an embodiment, one of the plurality of internal vehicle sensors may be a microphone(s). The comparison at step 722 of sub process 120 may be between an acoustic signal received by the microphone(s) and reference data corresponding to, for example, sounds emitted by a passenger. The reference data, which may be associated with a crying child or a cacophony of conversation, as the passenger, can include an acoustic signature corresponding to each. Accordingly, the comparison at step 722 of sub process 120 may be between the acoustic signal received at the microphone(s) and the reference data associated with each of the passenger sounds. An output of the comparison may be a correlation value reflecting a similarity between the acoustic signal received by the microphone(s) and respective reference data.

In another embodiment, one of the plurality of internal vehicle sensors may be a camera(s). In order to perform the comparison between an image acquired by the camera(s) and reference data including images corresponding to, for example, rear passengers of the vehicle, image processing may be performed to identify features of the image. The image processing may be, in an example, semantic image segmentation. Accordingly, reference images of passengers, objects, and the like, may be similarly processed prior to comparison with the image acquired by the camera(s). In an embodiment, the image acquired by the camera(s) may be processed according to semantic image segmentation and then the passengers may be extracted from the image prior to comparison with reference images. In this way, an output of the comparison may be correlations between the child, for instance, of the image acquired by the camera and each of the reference images of passengers. It can be appreciated that other approaches may be used, keeping with the spirit of the invention, such as neural networks trained in image classification.

In another embodiment, one of the plurality of internal vehicle sensors may be an infrared imaging unit(s). The infrared imaging unit(s) may be employed within a gaze detection unit of the vehicle. In order to perform the comparison between image(s) acquired by the infrared imaging unit(s) and reference data including images corresponding to, for example, inattentive drivers, image processing may be performed to localize a gaze of the driver and determine a focus thereof. The image processing may evaluate a gaze of the driver, determined from images of the infrared imaging unit(s), relative to a longitudinal axis of the vehicle. In this way, an output of the comparison may be a correlation between the gaze of the driver and a referential gaze within an image of the reference database.

Following comparison of the data from each of the plurality of internal vehicle sensors and the reference data from the reference database, correlations can be compared to respective detection thresholds at step 723 of sub process 120. By comparing each correlation value to a respective detection threshold, sub process 120 ensures that conditions of the cabin of the vehicle environment are detected and identified with confidence. For instance, if no adverse condition is sufficiently correlated with the data from the plurality of internal vehicle sensors (i.e. correlation value above detection threshold), no adverse condition is detected. Accordingly, method 100 may proceed to sub process 130 via step 724 of sub process 120 and the action corresponding to the subsequent driver input can be performed.

Alternatively, if it is determined that one or more of the data from the plurality of internal vehicle sensors are sufficiently correlated with at least one reference data from the reference database, sub process 120 may proceed to step 725, wherein the correlation values associated with each of the sufficiently correlated pairs are ranked. As with step 714 of sub process 110 of FIG. 5, the correlation values may be normalized relative to respective detection thresholds and then ranked such that the most confident correlations are highly ranked. In this way, the most highly ranked normalized correlation value can be selected as the adverse condition present in the cabin of the vehicle environment.

This ranking system allows for confident identification of adverse conditions. For instance, a vehicle traveling at dusk may be unable to confidently identify a passenger, or a position thereof, using cameras. However, an infrared imaging unit(s) can evaluate the cabin environment to determine that a gaze of a driver of the vehicle.

Figure 7B:
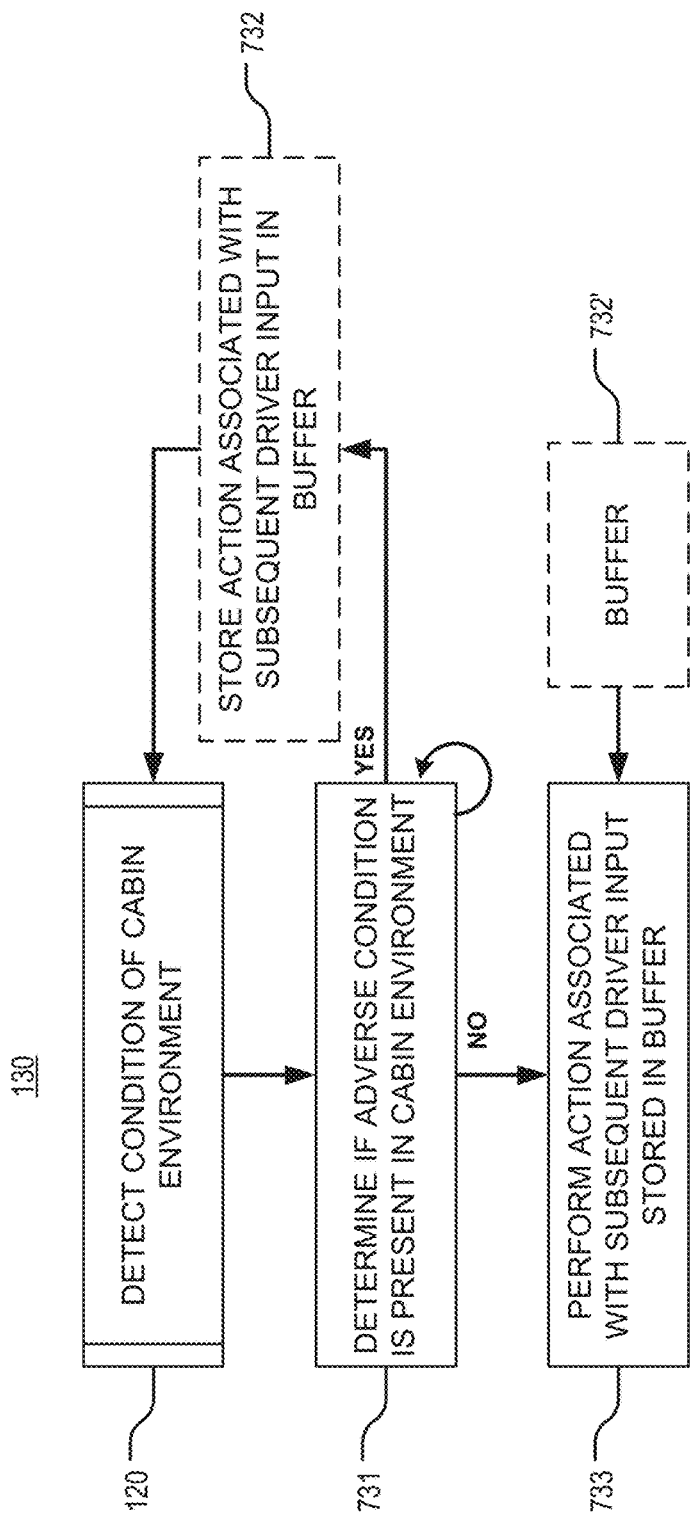
FIG. 7B is a flow diagram of a sub process of a method of performing an input of a driver of a vehicle, according to an exemplary embodiment of the present disclosure.

With reference now to FIG. 7B, the output of sub process 120 of method 100 can be passed to sub process 130 of method 100.

At step 731 of sub process 130, the output of sub process 120 of method 100 can be evaluated to determine if an adverse cabin condition is present. If the output of sub process 120 of method 100 initially indicates that no adverse condition is present in the cabin of the vehicle environment, sub process 130 proceeds to step 733, bypassing step 732 of sub process 130. However, if the output of sub process 120 of method 100 initially indicates that an adverse condition, such as a crying child, is present in the cabin of the vehicle environment, step 731 of sub process 130 is iteratively performed and, concurrently, an action associated with the subsequent driver input is stored in a buffer at step 732 of sub process 130. In this way, and appreciating that the crying child will occupy a portion of the focus of the driver, distractions to the driver can be minimized. The buffer may be later accessed when it is determined the adverse condition is no longer present, in order to perform the action corresponding to the subsequent driver input.

Following iterative performance of step 731 of sub process 130, it may be determined that the adverse condition detected at sub process 120 of method 100 is no longer present in the cabin of the vehicle environment. Accordingly, sub process 130 may proceed to step 733 and the action associated with the subsequent driver input can be performed. As indicated above, the action associated with the subsequent driver input can be one that is stored in buffer and acquired at step 732', thereby eliminating the need to repeatedly query the driver and request the input be provided.

Of course, method 100 need not be dependent only on the sub processes described above with respect to FIG. 6A through FIG. 6B and FIG. 7A through FIG. 7B. As described with reference to FIG. 8, it is possible that method 100 is requires evaluation of data from both the plurality of internal vehicle sensors and the plurality of external vehicle sensors.

With reference now to FIG. 8, sub process 120 of method 100 will be further described in view of each of the plurality of internal vehicle sensors and the plurality of external vehicle sensors. Sub process 120 of method 100 of FIG. 8, in view of FIG. 4, provides a flow diagram describing determining a condition of a vehicle environment of the SAV, according to an exemplary embodiment of the present disclosure. As noted above, sub process 120 of method 100 may be performed independently of whether the initial driver input or the subsequent driver input is used. For simplification, and as a continuation of FIG. 4 and FIG. 5, FIG. 8 will be discussed assuming a subsequent driver input has been requested and received.

At step 821 of sub process 120, and concurrently at step 821' of sub process 120, data may be received from the plurality of external vehicle sensors and the plurality of internal vehicle sensors, respectively. The plurality of external vehicle sensors, described with respect to FIG. 2A and FIG. 2B, can include camera(s), surround view camera(s), radar(s), lidar(s), ultrasonic sensor(s), corner radar(s), microphone(s), and the like. The plurality of internal vehicle sensors, described with respect to FIG. 3A and FIG. 3B, can include camera(s), infrared imaging unit(s), radar(s), time of flight imaging unit(s), ultrasonic sensor(s), touch screen interface(s), haptic sensor(s), tactile control pad(s), microphone(s), and the like.

At step 822 of sub process 120, and concurrently at step 822' of sub process 120, the data received from each of the plurality of external vehicle sensors and from each of the plurality of internal vehicle sensors, respectively, can be compared to reference data, corresponding to a respective external vehicle sensor or a respective internal vehicle sensor, from within a reference database including data associated with adverse conditions. As described above with reference to the input modalities of FIG. 5, the data received from each of the plurality of external sensors and each of the plurality of internal sensors may be unprocessed data and/or processed data.

In this way, data received from each of the plurality of external vehicle sensors and each of the plurality of internal vehicle sensors can be used, simultaneously, to determine the condition of the vehicle environment and to identify adverse conditions present within the cabin of the vehicle and within the surrounding environment of the vehicle, if present. The adverse conditions may include, among others, the presence of emergency vehicles, weather events resulting in reduced visibility and/or reduced vehicle traction, heavy traffic, a wayward gaze of a driver, and crying children, passengers not safely secured to seats within the cabin of the vehicle, or other distracting events that may be draw the focus of the driver away from the road.

Following comparison of the data from each of the plurality of external vehicle sensors and data from each of the plurality internal vehicle sensors to respective reference data from the reference database, correlations can be compared to respective detection thresholds at step 823 of sub process 120 and, concurrently, at step 823' of sub process 120. By comparing each correlation value to a respective detection threshold, sub process 120 ensures that conditions of the road of the vehicle environment and conditions of the cabin of the vehicle environment are detected and identified with confidence. For instance, if no adverse condition is sufficiently correlated with the data from the plurality of external vehicle sensors or the plurality of internal vehicle sensors (i.e. correlation value above detection threshold), no adverse condition is detected in the vehicle environment. Accordingly, method 100 may proceed to sub process 130 via step 824 of sub process 120 and the action corresponding to the subsequent driver input can be performed at sub process 130.

Alternatively, if it is determined that one or more of the data from the plurality of external vehicle sensors or the plurality of internal vehicle sensors are sufficiently correlated with a respective at least one reference data from the reference database, sub process 120 may proceed to step 825 and to step 825', respectively, wherein the correlation values associated with each of the sufficiently correlated pairs are ranked. As with step 514 of sub process 110 of FIG. 5, the correlation values may be normalized relative to respective detection thresholds and then ranked such that the most confident correlations are highly ranked. In this way, the most highly ranked normalized correlation value can be selected as the adverse condition present in the road of the vehicle environment or in the cabin of the vehicle environment.

According to an embodiment, and in view of FIG. 8, it can be appreciated that method 100 does not proceed to sub process 130 unless both of step 823 of sub process 120 and step 823' of sub process 120 determine that an adverse condition of the vehicle environment is not, present. If either step indicates the presence of an adverse condition, sub process 120 provides this indication to sub process 130 of method 100. This ensures the driver is not experiencing distractions within the vehicle or outside of the vehicle prior to implementing a requested action.

The flow diagram of FIG. 9 describes the flow diagram of FIG. 1, wherein only a single input modality is available. For instance, the input modality may be a microphone(s) as a component of a voice recognition system.

At step 105 of method 100, initial input data corresponding to an initial driver input may be received by an ECU of the SAV from an input modality. A reliability of the initial driver input via the input modality can be evaluated. The evaluation may include a comparison of a confidence level of a vehicle sensor associated with the input modality and a threshold confidence level of the vehicle sensor. For instance, when the input modality is via the voice recognition module, the evaluation may determine that a confidence level of a microphone(s) or other acoustic unit(s) associated with the voice recognition module is below a threshold confidence level required for continued processing. This may be the result of, among other things, increased background noise during high speed travel or during weather events.

If the evaluation determines, at step 105 of method 100, the reliability of the initial driver input via the input modality is sufficient (i.e. confidence level at or above threshold), method 100 may proceed to sub process 120.

Alternatively, if the evaluation at step 105 of method 100 determines the reliability of the initial driver input via the input modality is insufficient (i.e. confidence level below threshold), method 100 returns to step 105 and a subsequent driver input is requested via the input modality.

After requesting the subsequent driver input and receiving the subsequent driver input via the input modality, sub process 120 of method 100 determines a condition of a road of a vehicle environment that, in part, determines if an action associated with the subsequent driver input should be performed. The road condition determination can include, among other things, a detection of an adverse condition of a road of surrounding the vehicle. In an embodiment, the adverse condition may be an emergency vehicle or other distracting event, such as a weather event and the like. The determination of the condition of the road of the vehicle environment, along with the subsequent driver input, may be output from sub process 120 of method 100.

Accordingly, sub process 130 of method 100 receives the determination of the condition of the road of the vehicle environment and the subsequent driver input. If the output indicates the condition of the road of the vehicle environment is determined to be an adverse condition, sub process 130 of method 100 can be iteratively performed until the adverse condition has subsided and the output from sub process 120 of method 100 indicates the same. Concurrently, the subsequent driver input can be stored in a database until the action associated with the subsequent driver input can be safely performed.

Upon receiving the output indicating the adverse condition has subsided and the road condition is determined to be a normal condition (i.e. no adverse condition detected), the action associated with the subsequent driver input can be performed at sub process 130 of method 100. The action can be, for instance, placing a phone call to a friend.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "processing circuitry" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an application-specific integrated circuit.

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be Supplemented by, or incorporated in, special purpose logic circuitry.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

FIG. 10 is a block diagram of internal components of an example of a vehicle control system (VCS) that may be implemented, according to an embodiment of the present disclosure. As discussed above, the VCS may be integral with or include an electronics control unit (ECU). For instance, the ECU of the VCS 1002 may include or be in communication with software and hardware associated with a voice recognition module, an eye tracking and gaze detection module, a tactile module, and a gesture recognition module, among others. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations.

The VCS 1002 is shown comprising hardware elements that can be electrically coupled via a BUS 1067 (or may otherwise be in communication, as appropriate). The hardware elements may include processing circuitry 1061 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 1063, depending on desired functionality. The VCS 1002 also can include one or more input device controllers 1070, which can control without limitation an in-vehicle touch screen, a touch pad, microphone, camera(s), infrared camera(s), button(s), dial(s), switch(es), and/or the like. The VCS 1002 can also include one or more output device controllers 1062, which can control without limitation a display, light emitting diode (LED), speakers, and/or the like.

The VCS 1002 might also include a wireless communication hub 1064, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 1064 may permit data to be exchanged with a network, wireless access points, other computer systems, and/or any other electronic devices described herein. The communication can be carried out via one or more wireless communication antenna(s) 1065 that send and/or receive wireless signals 1066. The wireless communication hub 1064 may allow for vehicle-to-vehicle communication, in an embodiment.

Depending on desired functionality, the wireless communication hub 1064 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The VCS 1002 can further include sensor controller(s) 1074. Such controllers can control, without limitation, the plurality of vehicle sensors 1068 described above with respect to FIG. 2A through FIG. 3B, including, among others, one or more accelerometer(s), gyroscope(s), camera(s), infrared camera(s) radar(s), lidar(s), ultrasonic sensor(s), magnetometer(s), altimeter(s), microphone(s), proximity sensor(s), light sensor(s), and the like.

Embodiments of the VCS 1002 may also include a Satellite Positioning System (SPS) receiver 1071 capable of receiving signals 1073 from one or more SPS satellites using an SPS antenna 1072. The SPS receiver 1071 can extract a position of the device, using conventional techniques, from satellites of an SPS system, such as a global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1071 can be used with various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

In an embodiment, the SPS receiver 1071 of the VCS 1002 may be provided as a query to a weather forecasting service (e.g., a meteorological service) in order to obtain a current weather condition in the environment surrounding the SAV. The query may be provided via direct communication with a weather forecasting service via Internet and/or by accessing a weather forecast stored and updated within a cloud-based storage center. The weather forecast may be used by the ECU of the VCS 1002 to determine whether attention of a driver may be strained.

The VCS 1002 may further include and/or be in communication with a memory 1069. The memory 1069 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1069 of the VCS 1002 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable storage medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An apparatus for performing an action associated with a driver input indicated via an input modality of a human machine interface of a vehicle, the apparatus comprising processing circuitry configured to receive initial data corresponding to an initial driver input via a first input modality of the human machine interface of the vehicle, compare a confidence level of the initial data to a confidence level threshold associated with the first input modality of the human machine interface of the vehicle, request, based on the comparison, a subsequent driver input via a second input modality of the human machine interface of the vehicle, determine a presence of an adverse condition within a vehicle environment, and perform an action associated with the subsequent driver input based on the presence of the adverse condition within the vehicle environment.

(2) The apparatus according to (1), wherein the processing circuitry is configured to perform an action associated with the subsequent driver input based on the presence of the adverse condition within the vehicle environment by delaying performing the an action associated with subsequent driver input when the adverse condition is present within the vehicle environment.

(3) The apparatus according to either (1) or (2), wherein the processing circuitry is configured to delay the performing the an action associated with subsequent driver input when the adverse condition is present within the vehicle environment by entering, into a buffer, the action associated with the subsequent driver input, determining, iteratively, whether the adverse condition is present within the vehicle environment, and performing the action associated with the subsequent driver input when it is determined the adverse condition is not present within the vehicle environment.

(4) The apparatus according to any one of (1) to (3), wherein the processing circuitry is configured to determine the presence of the adverse condition within the vehicle environment by detecting, via external sensors of the vehicle, a presence of an emergency vehicle within the vehicle environment.

(5) The apparatus according to any one of (1) to (4), wherein the processing circuitry is configured to detect the presence of the emergency vehicle by audio recognition.

(6) The apparatus according to any one of (1) to (5), wherein the processing circuitry is configured to detect the presence of the emergency vehicle by image recognition.

(7) The apparatus according to any one of (1) to (6), wherein the processing circuitry is configured to determine the presence of the adverse condition within the vehicle environment by detecting, via internal sensors of the vehicle, a presence of a distracting event within the vehicle environment, the distracting event being inside a cabin of the vehicle.

(8) The apparatus according to any one of (1) to (7), wherein the processing circuitry is configured to request the subsequent driver input via the second input modality of the human machine interface of the vehicle by receiving data from each of a plurality of input modalities of the human machine interface of the vehicle, comparing a confidence level of the data from each of the plurality of input modalities of the human machine interface of the vehicle to a respective confidence level threshold associated with each of the plurality of input modalities of the human machine interface of the vehicle, ranking the plurality of input modalities of the human machine interface of the vehicle, based on the comparing, from lowest confidence to highest confidence, and selecting, as the second input modality of the human machine interface of the vehicle, an input modality of the plurality of input modalities of the human machine interface of the vehicle having the highest confidence.

(9) The apparatus according to any one of (1) to (8), wherein the plurality of input modalities of the human machine interface of the vehicle include infrared imaging units, cameras, touch screen interfaces, ultrasonic imaging units, haptic interfaces, steering wheel tactile pads, radars, or a combination thereof.

(10) An apparatus for performing an action associated with a driver input indicated via an input modality of a human machine interface of a vehicle, the apparatus comprising processing circuitry configured to receive data corresponding to the driver input via the input modality of the human machine interface of the vehicle, determine a presence of an adverse condition within a vehicle environment, and perform the action associated with the driver input based on the presence of the adverse condition within the vehicle environment.

(11) The apparatus according to (10), wherein the processing circuitry is configured to perform the action associated with the driver input based on the presence of the adverse condition within the vehicle environment by delaying performing the action associated with the driver input when the adverse condition is present within the vehicle environment.

(12) The apparatus according to either (10) or (11), wherein the processing circuitry is configured to delay the performing the action associated with the driver input when the adverse condition is present within the vehicle environment by entering, into a buffer, the action associated with the driver input, determining, iteratively, whether the adverse condition is present within the vehicle environment, and performing the action associated with the driver input when it is determined the adverse condition is not present within the vehicle environment.

(13) The apparatus according to any one of (10) to (12), wherein the processing circuitry is configured to determine the presence of the adverse condition within the vehicle environment by detecting, via external sensors of the vehicle, a presence of an emergency vehicle within the vehicle environment.

(14) The apparatus according to any one of (10) to (13), wherein the processing circuitry is configured to detect the presence of the emergency vehicle by audio recognition or by image recognition.

(15) The apparatus according to any one of (10) to (14), wherein the processing circuitry is configured to determine the presence of the adverse condition within the vehicle environment by detecting, via internal sensors of the vehicle, a presence of a distracting event within the vehicle environment, the distracting event being inside a cabin of the vehicle.

(16) A non-transitory computer-readable storage medium storing computer-readable instructions that, when executed by a computer, cause the computer to perform a method of performing an action associated with a driver input indicated via an input modality of a human machine interface of a vehicle, comprising receiving initial data corresponding to an initial driver input via a first input modality of the human machine interface of the vehicle, comparing a confidence level of the initial data to a confidence level threshold associated with the first input modality of the human machine interface of the vehicle, requesting, based on the comparison, a subsequent driver input via a second input modality of the human machine interface of the vehicle, determining a presence of an adverse condition within a vehicle environment, and performing an action associated with the subsequent driver input based on the presence of the adverse condition within the vehicle environment.

(17) The non-transitory computer-readable storage medium according to (16), wherein the performing the action associated with the subsequent driver input based on the presence of the adverse condition within the vehicle environment includes delaying performing the action associated with the subsequent driver input when the adverse condition is present within the vehicle environment.

(18) The non-transitory computer-readable storage medium according to either one of (16) or (17), wherein the delaying the performing the action associated with the subsequent driver input when the adverse condition is present within the vehicle environment includes entering, into a buffer, the action associated with the subsequent driver input, determine, iteratively, whether the adverse condition is present within the vehicle environment, and performing the action associated with the subsequent driver input when it is determined the adverse condition is not present within the vehicle environment.

(19) The non-transitory computer-readable storage medium according to any one of (16) to (18), wherein the determining the presence of the adverse condition within the vehicle environment includes detecting, via external sensors of the vehicle, a presence of an emergency vehicle within the vehicle environment.

(20) The non-transitory computer-readable storage medium according to any one of (16) to (19), wherein the requesting the subsequent driver input via the second input modality of the human machine interface of the vehicle includes receiving data from each of a plurality of input modalities of the human machine interface of the vehicle, comparing a confidence level of the data from each of the plurality of input modalities of the human machine interface of the vehicle to a respective confidence level threshold associated with each of the plurality of input modalities of the human machine interface of the vehicle, ranking the plurality of input modalities of the human machine interface of the vehicle, based on the comparing, from lowest confidence to highest confidence, and selecting, as the second input modality of the human machine interface of the vehicle, an input modality of the plurality of input modalities of the human machine interface of the vehicle having the highest confidence.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for performing an action associated with a driver input indicated via an input modality of a human machine interface of a vehicle, the apparatus comprising:
  processing circuitry configured to
    receive initial data corresponding to an initial driver input via a first input modality of the human machine interface of the vehicle,
    compare a confidence level of the initial data to a confidence level threshold associated with the first input modality of the human machine interface of the vehicle,
    request, based on the comparison, a subsequent driver input via a second input modality of the human machine interface of the vehicle,
    receive the subsequent driver input via the second input modality,
    determine a presence of an adverse condition within a vehicle environment after receiving the subsequent driver input,
    delay performing an action associated with the subsequent driver input when the adverse condition is present within the vehicle environment by entering, into a buffer, the action associated with the subsequent driver input, and determining, iteratively, whether the adverse condition is present within the vehicle environment, wherein the action is an adjustment of one of a plurality of systems of the vehicle, and
    perform the action associated with the subsequent driver input when it is determined that the adverse condition is not present within the vehicle environment.

2. The apparatus according to claim 1, wherein the processing circuitry is configured to determine the presence of the adverse condition within the vehicle environment by
    detecting, via external sensors of the vehicle, a presence of an emergency vehicle within the vehicle environment.

3. The apparatus according to claim 2, wherein the processing circuitry is configured to detect the presence of the emergency vehicle by audio recognition.

4. The apparatus according to claim 2, wherein the processing circuitry is configured to detect the presence of the emergency vehicle by image recognition.

5. The apparatus according to claim 1, wherein the processing circuitry is configured to determine the presence of the adverse condition within the vehicle environment by
    detecting, via internal sensors of the vehicle, a presence of a distracting event within the vehicle environment, the distracting event being inside a cabin of the vehicle.

6. The apparatus according to claim 1, wherein the processing circuitry is configured to request the subsequent driver input via the second input modality of the human machine interface of the vehicle by
    receiving data from each of a plurality of input modalities of the human machine interface of the vehicle,
    comparing a confidence level of the data from each of the plurality of input modalities of the human machine interface of the vehicle to a respective confidence level threshold associated with each of the plurality of input modalities of the human machine interface of the vehicle,
    ranking the plurality of input modalities of the human machine interface of the vehicle, based on the comparing, from lowest confidence to highest confidence, and
    selecting, as the second input modality of the human machine interface of the vehicle, an input modality of the plurality of input modalities of the human machine interface of the vehicle having the highest confidence.

7. The apparatus according to claim 6, wherein the plurality of input modalities of the human machine interface of the vehicle include infrared imaging units, cameras, touch screen interfaces, ultrasonic imaging units, haptic interfaces, steering wheel tactile pads, radars, or a combination thereof.

8. A method for performing an action associated with a driver input indicated via an input modality of a human machine interface of a vehicle, the method comprising:
    receiving initial data corresponding to an initial driver input via a first input modality of the human machine interface of the vehicle;
    comparing a confidence level of the initial data to a confidence level threshold associated with the first input modality of the human machine interface of the vehicle;
    requesting, based on the comparison, a subsequent driver input via a second input modality of the human machine interface of the vehicle;
    receiving the subsequent driver input via the second input modality;
    determining a presence of an adverse condition within a vehicle environment after receiving the subsequent driver input;
    delaying performing an action associated with the subsequent driver input when the adverse condition is present within the vehicle environment by entering, into a buffer, the action associated with the subsequent driver input, and determining, iteratively, whether the adverse condition is present within the vehicle environment, wherein the action is an adjustment of one of a plurality of systems of the vehicle; and
    performing the action associated with the subsequent driver input when it is determined that the adverse condition is not present within the vehicle environment.

9. The method according to claim 8, wherein the determining the presence of the adverse condition within the vehicle environment includes
    detecting, via external sensors of the vehicle, a presence of an emergency vehicle within the vehicle environment.

10. The method according to claim 9, further comprising detecting the presence of the emergency vehicle by audio recognition or by image recognition.

11. The method according to claim 8, wherein the determining the presence of the adverse condition within the vehicle environment includes
    detecting, via internal sensors of the vehicle, a presence of a distracting event within the vehicle environment, the distracting event being inside a cabin of the vehicle.

12. A non-transitory computer-readable storage medium storing computer-readable instructions that, when executed by a computer, cause the computer to perform a method of performing an action associated with a driver input indicated via an input modality of a human machine interface of a vehicle, comprising:
    receiving initial data corresponding to an initial driver input via a first input modality of the human machine interface of the vehicle;
    comparing a confidence level of the initial data to a confidence level threshold associated with the first input modality of the human machine interface of the vehicle;
    requesting, based on the comparison, a subsequent driver input via a second input modality of the human machine interface of the vehicle;
    receiving the subsequent driver input via the second input modality;
    determining a presence of an adverse condition within a vehicle environment after receiving the subsequent driver input;
    delaying performing an action associated with the subsequent driver input when the adverse condition is present within the vehicle environment by entering, into a buffer, the action associated with the subsequent driver input, and determining, iteratively, whether the adverse condition is present within the vehicle environment, wherein the action is an adjustment of one of a plurality of systems of the vehicle; and
    performing the action associated with the subsequent driver input when it is determined that the adverse condition is not present within the vehicle environment.

13. The non-transitory computer-readable storage medium according to claim 12, wherein the determining the presence of the adverse condition within the vehicle environment includes
    detecting, via external sensors of the vehicle, a presence of an emergency vehicle within the vehicle environment.

14. The non-transitory computer-readable storage medium according to claim 12, wherein the requesting the subsequent driver input via the second input modality of the human machine interface of the vehicle includes
    receiving data from each of a plurality of input modalities of the human machine interface of the vehicle,
    comparing a confidence level of the data from each of the plurality of input modalities of the human machine interface of the vehicle to a respective confidence level threshold associated with each of the plurality of input modalities of the human machine interface of the vehicle,
    ranking the plurality of input modalities of the human machine interface of the vehicle, based on the comparing, from lowest confidence to highest confidence, and selecting, as the second input modality of the human machine interface of the vehicle, an input modality of the plurality of input modalities of the human machine interface of the vehicle having the highest confidence.

15. The apparatus according to claim 1, wherein the action is one of an adjustment of an audio system of the vehicle, an adjustment of a lighting system of the vehicle, or an adjustment of a navigation system of the vehicle.

\* \* \* \* \*